United States Patent
Kurooka et al.

(10) Patent No.: US 6,694,273 B2
(45) Date of Patent: Feb. 17, 2004

(54) RECEIVING APPARATUS, METHOD OF COMPENSATING FOR WAVEFORM DEGRADATION OF RECEIVED SIGNAL, APPARATUS AND METHOD FOR DETECTING WAVEFORM DEGRADATION, AND APPARATUS AND METHOD FOR MEASURING WAVEFORM

(75) Inventors: Takashi Kurooka, Kawasaki (JP); Hisaya Sakamoto, Kawasaki (JP); Akimitsu Miyazaki, Sapporo (JP); Tomoyuki Otsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 40 days.

(21) Appl. No.: 09/933,769

(22) Filed: Aug. 22, 2001

(65) Prior Publication Data

US 2002/0123851 A1 Sep. 5, 2002

(30) Foreign Application Priority Data

Mar. 2, 2001 (JP) ....................... 2001-059171

(51) Int. Cl.$^7$ ................................. G06F 5/00
(52) U.S. Cl. ............................. 702/69; 702/66; 702/67; 702/68; 702/70; 702/71
(58) Field of Search ................. 702/57, 4, 34, 702/61, 66–69, 70, 71, 73, 74, 103, 118, 124, 126, 176, 182; 356/450; 382/232; 600/405; 375/216; 385/11–15, 147

(56) References Cited

U.S. PATENT DOCUMENTS 5,935,068 A * 8/1999 Zhu et al. ................ 600/443
5,999,289 A    12/1999 Ihara et al. ............... 359/124
6,016,379 A     1/2000 Bulow ...................... 385/147
6,307,868 B1 * 10/2001 Rakib et al. .............. 370/485
6,307,879 B1 * 10/2001 Moriyama ................. 375/219
2002/0048062 A1 * 4/2002 Sakamoto et al. ........ 359/124

FOREIGN PATENT DOCUMENTS

| JP | HEI 05-030085 | 2/1993 |
| JP | HEI 06-268555 | 9/1994 |
| JP | HEI 11-112428 | 4/1999 |
| JP | HEI 11-122173 | 4/1999 |

* cited by examiner

Primary Examiner—Marc S. Hoff
Assistant Examiner—Felix Suarez
(74) Attorney, Agent, or Firm—Staas & Halsey LLP

(57) ABSTRACT

In a receiving apparatus, there are included a compensation characteristic variable type waveform degradation compensating unit capable of compensating for waveform degradation of a received signal stemming from a transmission line, a received waveform measuring unit for measuring waveform data on the received signal (which will be referred to hereinafter as "received waveform data), and a control unit for controlling a compensation characteristic of the waveform degradation compensating unit to minimize a difference between frequency data on the received signal, obtained by converting the received waveform data acquired by the received waveform measuring unit into a frequency domain, and frequency data on a reference waveform free from waveform degradation. With this configuration, certain compensation for the waveform degradation of the received signal stemming from chromatic dispersion or the like becomes feasible without using a dispersion compensation fiber.

76 Claims, 21 Drawing Sheets

REFERENCE WAVEFORM FOR BIT RATE: 10 Gb/s

REFERENCE WAVEFORM

FREQUENCY COMPONENT (AMPLITUDE) OF REFERENCE WAVEFORM

GROUP DELAY COMPONENT OF REFERENCE WAVEFORM

↕ COMPARISON

DEGRADED WAVEFORM

FREQUENCY COMPONENT (AMPLITUDE) OF DEGRADED WAVEFORM

↕ COMPARISON

GROUP DELAY COMPONENT OF DEGRADED WAVEFORM

CORRECTION CHARACTERISTIC (AMPLITUDE)

CORRECTION CHARACTERISTIC (GROUP DELAY)

EQUALIZED WAVEFORM AFTER APPLICATION OF CORRECTION CHARACTERISTIC TO DEGRADED WAVEFORM

FREQUENCY COMPONENT (AMPLITUDE) OF EQUALIZED WAVEFORM

GROUP DELAY COMPONENT OF EQUALIZED WAVEFORM

FIG. 15

331
DISPERSION COMPENSATION TABLE
(DISPERSION COMPENSATION QUANTITY OF l1 DISPERSION COMPENSATOR DETERMINES OPTIMUM DISPERSION QUANTITY FOR OTHER CHANNELS)

| | $\lambda 1$ COMPENSATION QUANTITY OF $\lambda 1$ DISPERSION COMPENSATOR | A1~A2 | B1~B2 | C1~C2 | ... |
|---|---|---|---|---|---|
| COMPENSATION QUANTITY FOR EACH CHANNEL | $\lambda 1$ | a1 | b1 | c1 | |
| | $\lambda 2$ | a2 | b2 | c2 | |
| | : | : | : | : | : |
| | $\lambda n$ | an | bn | cn | |

ORIGINAL OPTICAL WAVEFORM

CASE IN WHICH APERTURE IN
AMPLITUDE DIRECTION DECREASES

CASE IN WHICH APERTURE IN
PHASE DIRECTION DECREASES

RECEIVING APPARATUS, METHOD OF COMPENSATING FOR WAVEFORM DEGRADATION OF RECEIVED SIGNAL, APPARATUS AND METHOD FOR DETECTING WAVEFORM DEGRADATION, AND APPARATUS AND METHOD FOR MEASURING WAVEFORM

BACKGROUND OF THE INVENTION (1) Field of the Invention

The present invention relates to a receiving apparatus and a method of compensating for waveform degradation of received signals, and further to an apparatus and method for detecting waveform degradation, and an apparatus and method for measuring waveforms. More particularly, the invention relates to a technique suitable for use in compensation for waveform degradation an optical signal suffers due to an optical transmission line.

(2) Description of the Related Art

FIG. 20 is a block diagram showing one example of the existing optical transmitting system. In FIG. 20, an optical transmission system 100 is made up of an optical transmission apparatus 200, an optical repeater (optical amplifier) 300, and an optical receiving apparatus 400, with an optical signal sent from the optical transmitting apparatus 200 being transmitted through an optical transmission line 500 to the optical receiving apparatus 400 while being repeated/amplified properly in the optical repeater 300. Incidentally, although only one optical repeater 300 exists in the illustration of FIG. 20, naturally, two or more optical repeaters are employable, or no need therefor arises, depending on an optical signal transmission distance.

As the aforesaid optical transmission line 500, there has frequently been used a single-mode optical fiber (SMF) of a wavelength (referred to as "zero dispersion wavelength") at which chromatic dispersion becomes almost zero being in a 1.3-$\mu$m (micrometer) band (see a chromatic dispersion characteristic 600 in FIG. 22). The "chromatic dispersion" signifies the property that the propagation speed in an optical fiber varies with optical wavelength, stemming from material dispersion (see a broken line 800 in FIG. 22) or structure (waveguide) dispersion (see a chain line 900 in FIG. 22) of the optical fiber itself (that is, with respect to the zero dispersion wavelength, the long wavelength side delays while the short wavelength side advances). In other words, the "zero dispersion wavelength" means a wavelength at which no advance nor delay occurs while light (wavelength) propagates in an optical fiber.

The reason for the frequent use of SMF as the optical transmission line 500 is because its transmission loss is at a minimum in an optical transmission band (1.55-$\mu$m band) put frequently to use for the WDM optical transmission, and long-distance transmission is feasible. However, the employment of SMF causes the waveform degradation arising from the chromatic dispersion to occur remarkably at high-speed transmission of an optical signal.

For example, in the case of long-distance transmission of a high-speed optical signal exceeding 2.5 Gb/s (gigabit/second) through the use of SMF, there occurs the phenomenon that a waveform degradation occurs in the optical signal due to the chromatic dispersion, that is, the degree of aperture of an eye pattern of the optical signal (which will be referred to hereinafter as "eye aperture") becomes smaller. In this connection, the waveform degradation arising from the chromatic dispersion includes a case (see FIG. 21B) in which the eye aperture in the amplitude direction becomes smaller (waveform is rounded) as compared with the original transmission waveform (see FIG. 21A) and a case (see FIG. 21C) in which the eye aperture in the phase direction decreases (phase is compressed) with respect to the original transmission waveform.

The difference therebetween depends upon the designs (type of the optical transmission line 500, optical transmission band, chirping setting, and others) on the optical transmission system. For example, in a common optical transmission system in which optical transmission is made in an optical transmission band of 1.55 $\mu$m through the use of SMF whose zero dispersion wavelength is in a 1.3-$\mu$m band, if the chirping setting is made such that the rise of the waveform is at the short-wavelength side (the fall is at the long-wavelength side), then the long-wavelength side intensively receives the effect of the chromatic dispersion so that the waveform tends to be rounded. If the chirping setting is made conversely, then the adverse tendency arises.

Meanwhile, such waveform degradation stemming from the chromatic dispersion becomes more noticeable as the optical signal transmission distance (repeating distance) becomes longer to cause the deterioration of the reception sensitivity characteristic of an optical receiver 402, described later, (difficult identification/regeneration of a signal). For this reason, so far, a dispersion-shifted fiber (DSF) (see a chromatic dispersion characteristic 700 in FIG. 22) in which the zero dispersion wavelength is shifted to a 1.55-$\mu$m band forming an optical transmission band has been put to use for the optical transmission line 500, thereby providing an optical transmission system 100 capable of limiting the influence of the chromatic dispersion in the optical transmission band. However, also in the case of the use of DSF, a further increase in optical signal transmission rate makes it difficult to disregard the waveform degradation arising from the chromatic dispersion as in the case of the use of SMF.

Accordingly, for whether SMF or DSF used as the optical transmission line 500, in a case in which the optical signal transmission rate becomes high to some extent, for example, a dispersion compensation fiber (DCF) 401 designed to have a chromatic dispersion characteristic contrary to the chromatic dispersion, the optical transmission line 500 suffers, has been put at the former stage of the optical receiver 402 as shown in FIG. 20 for compensating for the waveform degradation and enlarging the eye aperture.

However, in general, the degree of deterioration of the eye aperture acceptable to the optical receiver 402, i.e., the range of chromatic dispersion value permissible to the optical receiver 402, is restricted by the reception sensitivity characteristic of the optical receiver 402, and the chromatic dispersion value increases in proportion to the transmission distance (see FIG. 22); therefore, in the above-mentioned existing optical transmission system 100, there is a need to place the dispersion compensation fiber 401 having a different chromatic dispersion characteristic according to optical transmission distance (repeating distance) to show the range of chromatic dispersion value acceptable to the optical receiver 402.

Accordingly, the system sacrifices the flexibility and the needed type of dispersion compensation fiber 401 increases, which raises the cost at the system construction and the management cost after the system construction.

In addition, in the recent years, the transmission of an ultra-high-speed optical signal such as 10 Gb/s or 40 Gb/s [assuming that a 2.5-Gb/s optical signal is 16-wavelengths multiplexed (WDM: Wavelength Division Multiplex) signal, it is a 64-wavelengths multiplexed or 128-wavelengths multiplexed signal] has been realizable. In such a case, the wavelength (channel) interval becomes as extremely short as ¼ or ¹⁄₁₆ and, hence, the characteristic change resulting from the external factors such as variation in temperature of the optical transmission line 500 is not ignorable.

Thus, the improvement of the reception sensitivity characteristic of the optical receiver 402 by compensating fixedly for the chromatic dispersion through the use of the dispersion compensation fiber 401 as mentioned above encounters limitation even from the viewpoint of ultra-high speed and vary-large capacity required in the recent WDM transmission technology, and the difficulty of coping with the further increase in speed and capacity in the future is easily predictable.

Moreover, for the transmission of such an ultra-high-speed optical signal such as 10 Gb/s or 40 Gb/s, even the waveform degradation arising from the dispersion (for example, polarization mode dispersion) other than the chromatic dispersion or the nonlinear effects such as self phase modulation effect is not ignorable as the degradation factor to the reception sensitivity characteristic of the optical receiver 402. Therefore, in the case of the ultra-high-speed optical signal transmission, the simple use of the dispersion compensation fiber 401 is remote from the sufficient compensation for the waveform degradation.

SUMMARY OF THE INVENTION

The present invention has been developed with a view to eliminating the above-mentioned problems, and it is therefore an object of the invention to achieve secure compensation for the waveform degradation of a received signal arising from chromatic dispersion or the like without using a dispersion compensation fiber.

For this purpose, a receiving apparatus according to the present invention is characterized by comprising the following means:

(1) compensation characteristic variable waveform degradation compensating means capable of compensating for waveform degradation of a received signal;

(2) received waveform measuring means for measuring waveform data on the aforesaid received signal (which will be referred to hereinafter as "received waveform data"); and (3) control means for controlling a compensation characteristic of the aforesaid waveform degradation compensating means so that a difference between frequency data on the aforesaid received signal obtained by converting the received waveform data measured by the received waveform measuring means into a frequency domain and frequency data on a reference waveform free from waveform degradation reaches a minimum.

In the receiving apparatus thus arranged according to the invention, received waveform data is measured and the compensation characteristic of the waveform degradation compensating means is controlled so that the difference between the frequency data obtained by converting the measured received waveform data into a frequency domain and the frequency data on the reference waveform shows a minimum; therefore, for example, without the use of a waveform degradation compensator having a different compensation characteristic according to transmission distance of a reception signal, one type of receiving apparatus can cope with the waveform degradation because of the enlargement of the allowable range of the waveform degradation in the receiving apparatus. In addition, the frequency data in the frequency domain of the received signal is compared with the frequency data on the reference waveform to calculate a difference therebetween, which can cope with every waveform degradation.

Accordingly, the present invention provides the following advantages.

(1) Since, for compensation for waveform degradation of a received signal, the compensation characteristic of the waveform degradation compensating means is controlled so that the difference between frequency data obtained by converting the measured received waveform data into a frequency domain and frequency data on a reference waveform reaches a minimum, the allowable range of the waveform degradation in the receiving apparatus is enlargeable. Therefore, one type of receiving apparatus can cope flexibly with waveform degradation according to a plurality of types of transmission lines (optical transmission line, and other lines) or transmission distances, thereby considerably lowering the cost at the construction of a transmission system, the management cost after the construction, and others.

(2) Since a difference between the frequency data on the received signal and the frequency data on the reference waveform is calculated so that the compensation is made to minimize the difference therebetween, even if the waveform degradation varies due to a change of the characteristic of a transmission line stemming from the external factors such as temperature variation, it is possible to follow up the variations. In addition, for example, for an optical signal received through an optical transmission line, it is possible to deal with the waveform degradation the optical signal undergoes due to the chromatic dispersion, polarization mode dispersion, nonlinear optical effect and others. This enables realizing a receiving apparatus (optical receiving apparatus) capable of sufficiently handling the transmission of an ultra-high-speed optical signal such as 10 Gb/s (gigabit per second) or 40 Gb/s.

In this case, it is also appropriate that the aforesaid received waveform measuring means is composed of an equivalent-time sampling section for equivalent-time-sampling a received signal to acquire a plurality of wave-height data on the received signal and a wave-height data recording section for recording, as received waveform data, the wave-height data acquired by the equivalent-time sampling section. This can securely record/measure the received waveform data through the equivalent-time sampling even if the received signal is a high-speed signal.

Thus, the recording/measurement of the received waveform data is surely feasible regardless of whether or not the received signal is a high-speed signal, so a receiving apparatus is realizable which is capable of implementing sufficient compensation control on a high-speed signal.

In addition, it is also appropriate that the aforesaid equivalent-time sampling section is composed of a sampling timing generating circuit for generating a sampling timing on the basis of a reference clock synchronized with the received signal to output the sampling timing while shifting a timing of output thereof periodically, and a sampling circuit for sampling the received signal in accordance with the sampling timing generated in the sampling timing generating circuit to acquire the aforesaid wave-height data. This can surely realize the waveform measurement according to the equivalent-time sampling.

In this connection, it is preferable that the sampling timing generating circuit includes a divider for dividing the reference clock down and a delay control circuit for supplying the output of the divider to the sampling circuit while delaying periodically. This can generate the sampling timing with a proper operating clock at all times in the apparatus irrespective of the rate (frequency) of the reference clock. Moreover, even in the case of the employment of a divider designed to perform the dividing down into integer (N) times, the sampling timing can be outputted at an arbitrary timing through the delay control by the delay control circuit.

Accordingly, irrespective of the rate (frequency) of the reference clock, it is possible to generate a sampling timing with an appropriate operating timing at all times in the apparatus. In addition, even with the divider capable of dividing down into integer (N) times, it is possible to output the sampling timing at an arbitrary timing through the delay control by the delay control circuit, which can realize the equivalent-time sampling using a simple construction and showing extremely high flexibility.

Furthermore, it is preferable that the aforesaid control means includes the following sections:

(1) a reference waveform data storing section for storing the frequency data on the reference waveform previously;

(2) a Fourier-transform section for performing Fourier transform of the received waveform data to obtain frequency data on the received signal;

(3) a difference calculating section for calculating a difference between the frequency data obtained by the Fourier transform section and the frequency data in the reference waveform data storing section;

(4) a compensation characteristic determining section for obtaining a compensation characteristic of the waveform degradation compensating means which minimizes the difference calculated by the difference calculating section; and (5) a control signal generating section for generating a control signal for controlling the aforesaid waveform degradation compensating means so that the waveform degradation compensating means has the compensation characteristic obtained by the compensation characteristic determining section.

This can univocally determine the optimum compensation characteristic of the waveform degradation compensating means which minimizes the difference of the frequency data calculated by the difference calculating section, and hence, a sweeping operation or the like for obtaining the optimum compensation characteristic becomes unnecessary, for example, as in the case in which a received signal quantity is monitored to control the compensation characteristic of the waveform degradation compensating means so that the monitored quantity reaches a predetermined quantity.

Accordingly, fast and certain compensation control becomes feasible.

If the aforesaid waveform degradation compensating means is constructed with an equalization amplifier having a variable frequency/phase characteristic as the aforesaid compensation characteristic, then it is possible to surely realize the waveform degradation compensation of a received signal (enlargement of the waveform degradation allowable range of the receiving apparatus), which contributes greatly to the realization of this receiving apparatus.

In this case, for example, if the equalization amplifier is made up of a plurality of band-pass filters having different pass bands with respect to the received signal, a plurality of phase shifters and a plurality of gain-variable amplifiers, then it is possible to provide an equalization amplifier capable of adjusting the frequency characteristic (amplitude and phase) at every pass band, thus realizing the waveform degradation compensation based on the equalization amplifier with high accuracy.

This can contribute greatly to the realization of this receiving apparatus.

In addition, in a case in which the received signal is a signal which is received through an optical transmission line and undergoes waveform degradation based on a chromatic dispersion characteristic of the optical transmission line as the aforesaid waveform degradation, if the waveform degradation compensating means is constructed with a variable dispersion compensator having a variable dispersion compensation characteristic as the aforesaid compensation characteristic while the aforesaid control means is designed to control the dispersion compensation characteristic of this variable dispersion compensator, it is possible to compensate for the waveform degradation due to the chromatic dispersion characteristic for enlarging the waveform degradation allowable range of the receiving apparatus (optical receiving apparatus) without using a different chromatic dispersion compensating fiber according to length of the optical transmission line (that is, transmission distance on a signal to be received).

Accordingly, one type of receiving apparatus can deal flexibly with the waveform degradation based on the dispersion characteristic according to a plurality of optical transmission lines or transmission distances without using different chromatic dispersion compensating fibers according to types of optical transmission lines or lengths thereof, which can realize a low-priced receiving apparatus and considerably reduce the cost at the construction of an optical transmission system and the management cost after the construction thereof.

Furthermore, a receiving apparatus according to the present invention is characterized by comprising the following components:

(1) a demultiplexing section for receiving a wavelength-multiplexed optical signal (which will be referred to as hereinafter as a "WDM signal") comprising a plurality of types of wavelengths multiplexed, through an optical transmission line to perform demultiplexing according to wavelength;

(2) compensation characteristic variable type waveform degradation compensating means capable of compensating for waveform degradation the WDM signal is subjected to due to a dispersion characteristic of the optical transmission line;

(3) received waveform degradation detecting means provided with respect to at least one optical signal with a specified wavelength, of the demultiplexed optical signals from the demultiplexing section for detecting a difference between frequency data in a frequency domain of a received signal after photoelectric conversion of the optical signal and frequency data on a reference waveform free from waveform degradation; and (4) control means for controlling a compensation characteristic of the waveform degradation compensating means so that the difference on the specified wavelength, obtained by the received waveform degradation detecting means, reaches a minimum.

In the receiving apparatus thus constructed according to the present invention, the difference of at least one received signal with a specified wavelength in frequency data from a reference waveform which does not suffer waveform degradation is obtained through calculation to control the compensation characteristic of the waveform degradation compensating means on the basis of the difference therebetween for compensating for the waveform degradation of the WDM signal; therefore, without employing a dispersion compensation fiber having a different dispersion compensation characteristic according to WDM signal transmission distance, one receiving apparatus can cope with the waveform degradation owing to the enlargement of the allowable range of the waveform degradation of the received signal.

In other words, since the difference (waveform degradation) detecting system undertakes only one wavelength at the smallest, not only the advantages and effects similar to those mentioned above are attainable but also the size reduction of the receiving apparatus is achievable.

In addition, since the compensation control is implemented on the basis of the difference in frequency data calculated, it can cope with the waveform degradation the optical signal undergoes due to not only the chromatic dispersion but also the polarization mode dispersion or nonlinear optical effects. In consequence, it can deal sufficiently with the transmission of an ultra-high-speed optical signal, such as 10Gb/s (gigabit per second) or 40 Gb/s.

In this case, it is also appropriate that the aforesaid waveform degradation compensating means is constructed as a dispersion characteristic variable type variable optical dispersion compensator placed at the former stage of the demultiplexing section, while the control means is constructed as a batch compensation control section made to batch-control a dispersion characteristic of the variable optical dispersion compensator in common with respect to the aforesaid wavelengths.

With this configuration, since the compensation control on a multi-wavelength optical signal can be executed in batch in common with respect to the wavelengths, the scale reduction of the control system is achievable, which leads to the size reduction of the receiving apparatus.

In particular, in this case, since the compensation takes place at the stage of an optical signal, as compared with the compensation at the stage of an electric signal after the photoelectric conversion, the received signal waveform degradation allowable range is further enlargeable, thus lengthening the optical transmission distance one type of receiving apparatus can deal with. This further reduce the cost at the construction of the optical transmission system and the management cost after the construction thereof.

Still additionally, it is also appropriate that the aforesaid waveform degradation compensating means is constructed with a plurality of dispersion characteristic variable type variable optical dispersion compensators each provided for each of optical signals before photoelectric conversion at the latter stage of the aforesaid demultiplexing section while the control means is constructed as an individual compensation control section for calculating differences on all wavelengths on the basis of the aforesaid difference with respect to the aforesaid specified wavelength to control dispersion compensation characteristics of the variable optical dispersion compensators individually so that each of the differences reaches a minimum.

With this arrangement, since the compensation control is implemented with respect to each of the wavelengths, as compared with the batch compensation control, it is possible to realize the compensation with higher accuracy. Moreover, also in this case, the compensation is made at the stage of the optical signal to enlarge the received signal waveform degradation allowable range, thereby further lengthening the optical transmission distance one type of receiving apparatus can deal with.

Furthermore, it is also appropriate that the aforesaid received waveform degradation detecting means is provided with respect to each of the wavelengths and the aforesaid waveform degradation compensating means is composed of a dispersion characteristic variable type variable optical dispersion compensator placed at the former stage of the aforesaid demultiplexing section and a plurality of frequency/phase characteristic variable type equalization amplifiers placed with respect to each of electric signals after the photoelectric conversion of the demultiplexed optical signals from the aforesaid demultiplexing section, while the aforesaid control means is composed of variable optical dispersion compensators each for controlling a frequency/phase characteristic of the corresponding equalization amplifier according to wavelength so that the difference detected by the corresponding received waveform degradation detecting means reaches a minimum and a batch compensation control section for batch-controlling the dispersion characteristics of the variable optical dispersion compensators on the basis of the differences on the aforesaid specified wavelength in common with respect to the wavelengths.

Since this configuration performs the compensation at two stages, that is, the batch compensation by the variable optical dispersion compensator at the stage of the optical signal (WDM signal) in common with respect to the respective wavelengths and the compensation by the equalization amplifier at the stage of the electric signal with respect to each wavelength after the photoelectric conversion, it is possible to enhance the waveform degradation compensation ability as a whole, and further to additionally enlarge the received signal waveform degradation allowable range.

In addition, in this case, since the compensation at the stage of the optical signal is first performed so that the compensation by the equalization amplifier is made in a state where the waveform degradation is compensated to some extent, it is possible to lighten the compensation ability (frequency/phase characteristic variable range) needed for the equalization amplifier, which cuts the cost of the equalization amplifier down and hence contributes greatly to decreasing the cost of this receiving apparatus.

Still furthermore, it is preferable that the aforesaid received waveform degradation detecting means is composed of received waveform measuring means for measuring waveform data (received waveform data) of the received signal and calculating means for calculating a difference between frequency data obtained by converting the received waveform data, measured by the received waveform measuring means, into a frequency domain and frequency data on the aforesaid reference waveform. This ensures acquisition of the difference in frequency data between the received signal and the reference waveform.

Incidentally, the aforesaid received waveform degradation detecting means acts as a received signal waveform degradation detecting device and the aforesaid received waveform measuring means serves as a received signal waveform measuring unit, with they being applicable to any type of receiving apparatus.

That is, a received signal waveform degradation detecting device according to the present invention measures waveform data (received waveform data) of a received signal received through a transmission line in a state subjected to waveform degradation (received waveform measuring process) and calculates a difference between frequency data on the received signal obtained by converting the received waveform data into a frequency domain and frequency data on the reference waveform free from the waveform degradation (calculating process), thereby detecting the degree of waveform degradation of the received signal; therefore, this enables the detection of the waveform degradation of a received signal in every receiving apparatus with high accuracy.

Moreover, the received signal waveform measuring unit according to the present invention equivalent-time-samples a received signal, received through a transmission line in a state where subjected to waveform degradation, to acquire a plurality of wave-height data on the received signal (equivalent-time sampling process) and records the acquired wave-height data as the waveform data on the received signal to be converted into a frequency domain for the calculation of the difference with respect to the frequency data on the reference waveform free from the waveform degradation (waveform data recording process); therefore, this ensures the measurement of the waveform data needed for the calculation in frequency data between the received signal and the reference waveform in any receiving apparatus.

BRIEF DESCRIPTION OF THE DRAWINGS

FIG. 15 is an illustration of one example of a dispersion compensation table to be used in the optical receiving apparatus shown in FIG. 14;

DESCRIPTION OF THE PREFERRED EMBODIMENTS

Embodiments of the present invention will be described hereinbelow with reference to the drawings.

(A) Description of an Embodiment (A-1) Description of Basic Mode

Figure 1:
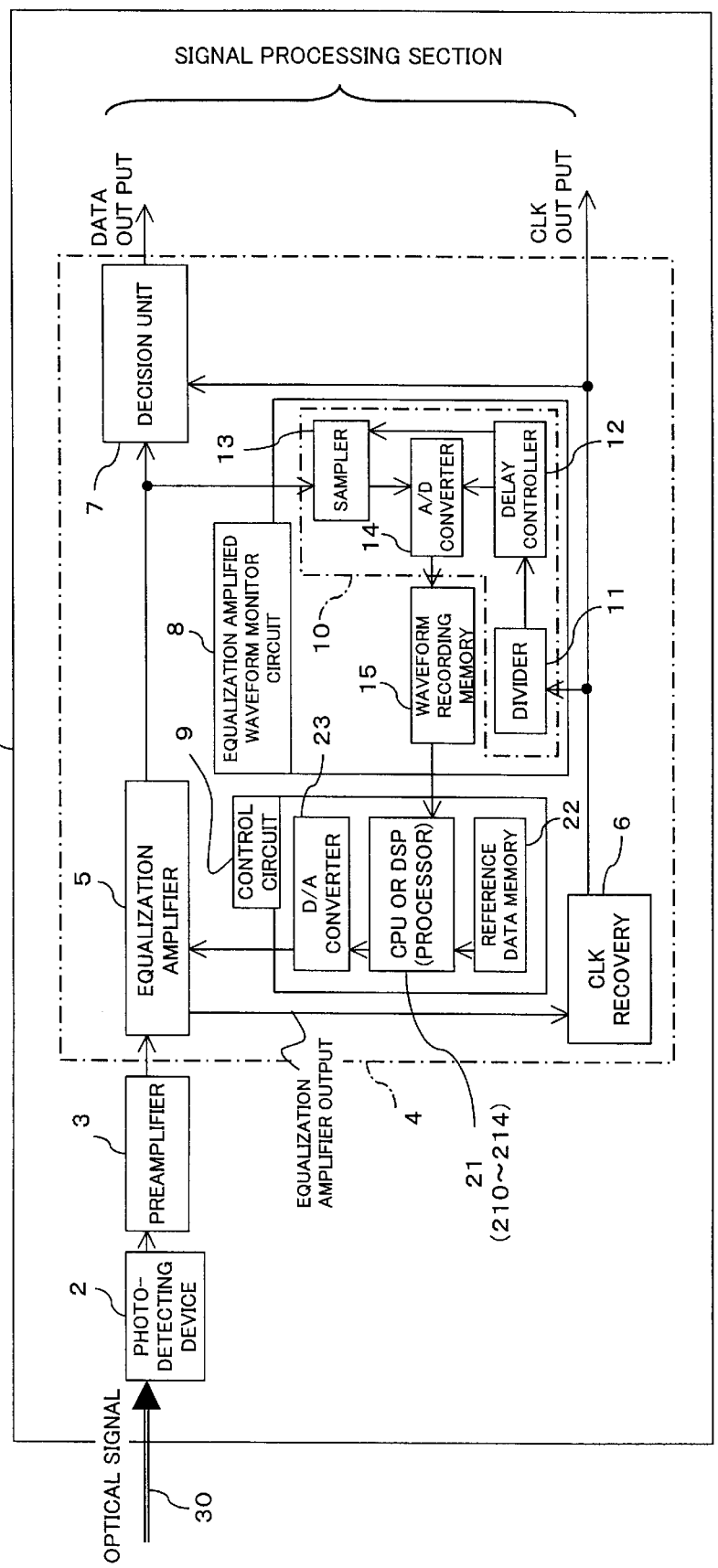
FIG. 1 is a block diagram showing a basic mode of an essential part of an optical receiving apparatus according to an embodiment of the present invention.
Figure 20:
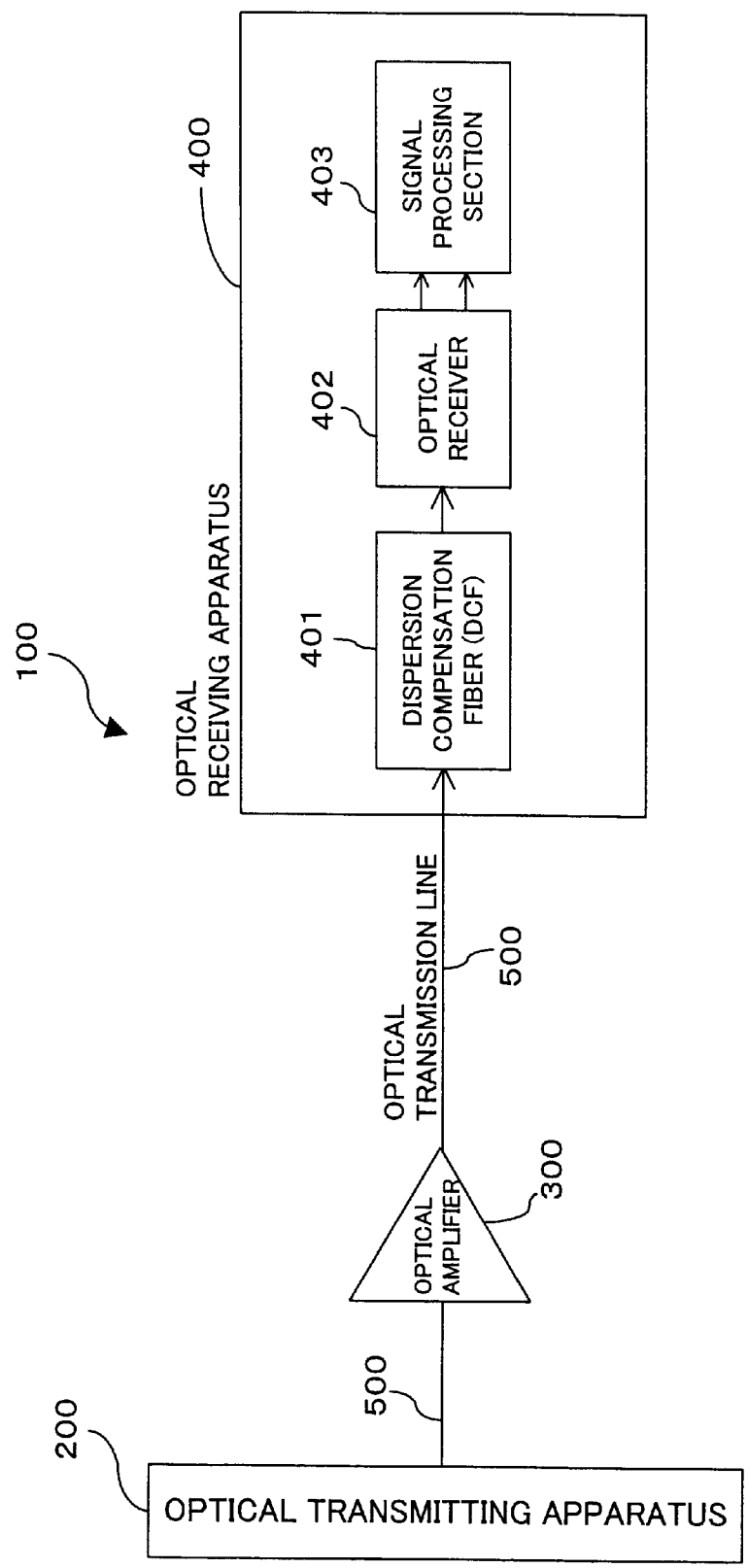
FIG. 20 is a block diagram showing one example of the existing optical transmission system.

FIG. 1 is a block diagram showing a basic mode of an essential part of an optical receiving apparatus according to an embodiment of the present invention. In FIG. 1, an optical receiving apparatus 1 is made up of a photo-detecting device 2 for receiving an optical signal transmitted through an optical transmission line 30 to convert it into a current signal, a preamplifier 3 for amplifying the output of the photo-detecting device 2 to convert the current signal into a voltage signal, and an optical receiver 4 for identifying/ regenerating the received signal while compensating (equalizing) for waveform degradation on the output of the preamplifier 3. In this case, the signal data (DATA) identified/regenerated by the optical receiver 4 and a clock (CLK) are outputted to a signal processing section (for example, see reference numeral 403 in FIG. 20) for digital signal processing. In addition, either SMF or DSF is applicable to the optical transmission line 30.

In this embodiment, as FIG. 1 shows, the optical receiver 4 further includes an equalization amplifier 5, a CLK extractor (CLK recovery unit) 6, a decision unit 7, an equalization-amplified waveform monitor circuit 8 and a control circuit 9.

The equalization amplifier (compensation characteristic variable type waveform degradation compensating means) 5 has a variable frequency characteristic as the compensation characteristic for the waveform degradation of the received signal made by the optical transmission line 30, and this frequency characteristic is controlled by the control circuit 9 so that the output (received signal) of the preamplifier 3 is amplified while its waveform degradation made due to the chromatic dispersion in the optical transmission line 30 is equalized (compensated) adaptively.

The "frequency characteristic" in this embodiment includes both amplitude components and phase components in a frequency domain in a wide sense (signifies frequency/phase characteristic), and the "frequency data" includes both data on the amplitude components in the frequency domain and data on the phase components therein.

Figure 2:
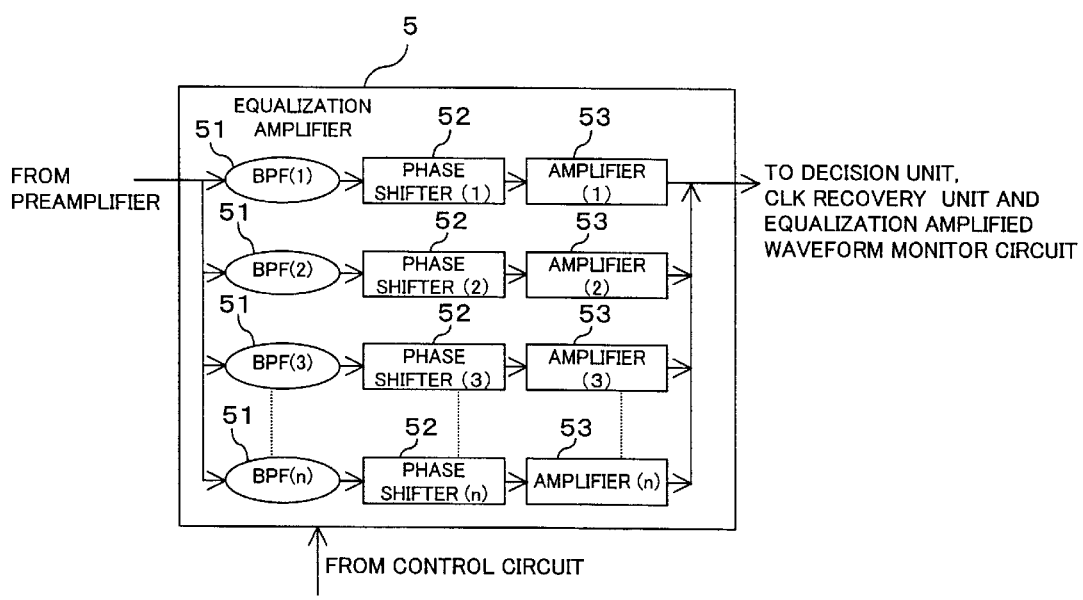
FIG. 2 is a block diagram showing an arrangement of an equalization amplifier shown in FIG. 1.

Accordingly, in this case, as FIG. 2 shows, this equalization amplifier 5 comprises a plurality of band-pass filters (BPF) 51 having, as the pass bands, a plurality of bands resulting from the division of the frequency band of the received signal, respectively, a plurality of phase shifters 52 each capable of implementing phase shift (group delay) control on each of the outputs (input signals) of these BPFs 51, and a plurality of gain variable type amplifiers 53 (variable attenuators are also acceptable) connected in series to the outputs of these phase shifters 52, respectively, and capable of amplifying the outputs (input signals) thereof. Incidentally, the positions of the phase shifters 52 and the amplifiers 53 are interchangeable with each other.

That is, a combination of each of the phase shifters 52 and each of the amplifiers 53 functions as a phase/gain control circuit capable of implementing the phase control and the gain control on each of the outputs of the BPFs 51, and therefore, the equalization amplifier 5 in this embodiment individually controls the phase of each of the phase shifters 52 and the gain of each of the amplifiers 53 (or variable attenuator) to give a different group delay and a different gain to the received signal according to pass band (which sometimes will be referred to hereinafter as "divided band") of the BPF 51, thereby adjusting the frequency characteristic (compensation characteristic) thereof properly.

The equalization amplifier 5 capable of individually controlling the frequency characteristics (amplitude and phase) according to pass band of the received signal is obtainable in this way, so high-accuracy waveform degradation compensation is realizable by the equalization amplifier 5, which contributes greatly to the realization of this optical receiving apparatus 1. Incidentally, it is also possible that, in order to make the aforesaid band division with high accuracy, a digital filter, designed to perform the filtering through logic, is used for the BPF 51.

The clock recovery unit 6 is for regenerating a clock from the aforesaid received signal, with the clock regenerated being supplied to the equalization-amplified waveform monitor circuit 8 (divider 11, which will be described later), the decision unit 7 and the above-mentioned signal processing section. In addition, the decision unit 7 is for identifying/regenerating the output of the equalization amplifier 5 in accordance with the clock regenerated by the clock recovery unit 6 to output signal data to the signal processing section, and the equalization amplification waveform monitor circuit (received waveform measuring means; received signal waveform measuring unit) 8 monitors the output waveform of the equalization amplifier 5, that is, a waveform (eye pattern) of the received signal, to measure waveform data thereof (which will equally be referred to hereinafter as "received waveform data").

Moreover, the control circuit (equalization amplifier control section; control means) 9 is for controlling the frequency characteristic of the equalization amplifier 5 to minimize the difference between frequency data on the received signal obtained by converting the eye pattern data on the received signal undergoing waveform degradation in the optical transmission line 30, measured by the equalization-amplified waveform monitor circuit 8 (which will hereinafter be referred to simply as a "monitor circuit 8"), into a frequency domain through the use of FFT (Fast Fourier Transform) and frequency data on a basic waveform free from waveform degradation.

Accordingly, the monitor circuit 8 further includes a divider 11, a delay controller 12, a sampler 13, an analog/digital (A/D) converter 14 and a waveform recording memory 15, while the control circuit 9 is composed of a processor 21 comprising a CPU (Central Processing Unit), DSP (Digital Signal Processor) or the like, a reference data memory 22 and a digital/analog (D/A) converter 23.

In this configuration, in the monitor circuit 8, the divider 11 divides down a high-speed (reference) clock (for example, 10 GHz or 40 GHz) synchronized with the received signal, regenerated by the clock extractor 6 to generate a clock suitable as an operational clock for the monitor circuit 8 (clock for facilitating equivalent-time sampling which will be described later), and the delay controller 12 controls the delay time of the reference clock divided down in the divider 11 to supply the output of the divider 11 as a trigger output (sampling timing) to the sampler 13 while delaying periodically. At this time, the delay time (delay value) is outputted to the A/D converter 14.

The sampler (sampling circuit) 13 samples the output of the equalization amplifier 5 at a trigger (sampling) timing from the delay controller 12 to acquire wave-height (amplitude) data, while the A/D converter 14 A/D-converts the wave-height data acquired through the sampling in the sampler 13 and the delay value from the delay controller 14.

In addition, the waveform recording memory (waveform data recording section) 15 stores a combination of the wave-height data and delay value A/D-converted in the A/D converter 14 to record the wave-height data corresponding to each delay time as waveform data on the received signal to be converted (FFT) into a frequency domain for the calculation of a difference with respect to the frequency data on a reference waveform which will be described later. For example, this waveform recording memory 15 is realizable with a RAM or the like.

Figure 3:
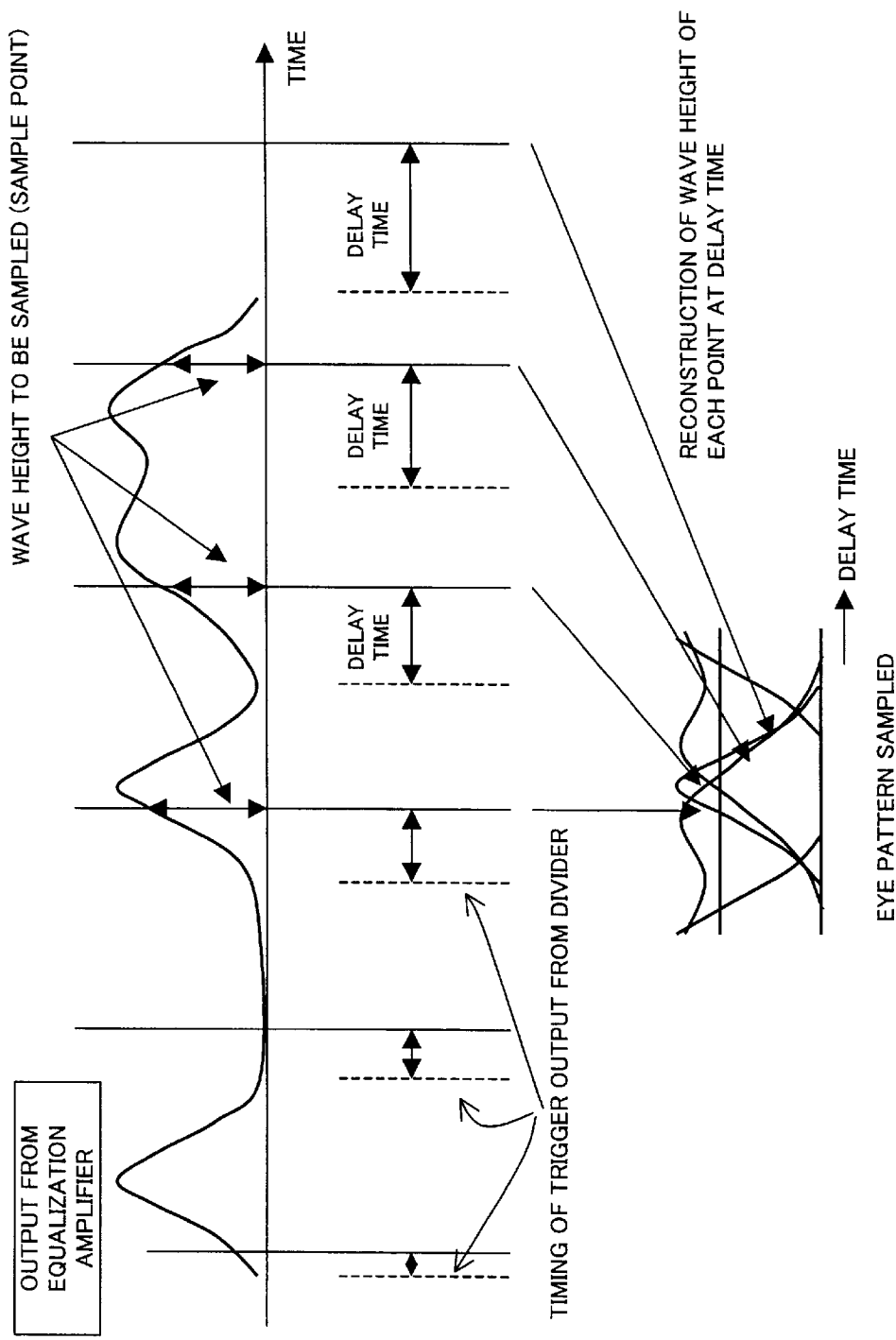
FIG. 3 is an illustrative view useful for explaining equivalent-time sampling in an equalization-amplified waveform monitor circuit shown in FIG. 1.

In this configuration, in this embodiment, the delay controller 12 increases the aforesaid delay time consecutively (periodically) to shift (delay) the sampling timing consecutively, for example, as shown illustratively in FIG. 3 so that wave-height data is recorded in the waveform recording memory 15 at each timing. The recorded wave-height data corresponding to each delay time is reconstructed at a period according to a bit rate of the received signal, thereby providing a waveform (eye pattern) of the received signal.

That is, a section comprising the divider 11, the delay controller 12, the sampler 13 and the A/D converter 14 functions as an equivalent-time sampling section 10 for equivalent-time-sampling a received signal to acquire a plurality of wave-height data on the received signal, and a section comprising the divider 11 and the delay controller 12 functions as a sampling timing generating circuit for generating a sampling time on the basis of a reference clock synchronized with the received signal to shift the output timing periodically and output it.

Furthermore, in the control circuit 9, the reference data memory 22 is for previously storing reference data (frequency data of a reference waveform which is not subjected to waveform degradation) to be referred to (to be compared) in obtaining a difference in frequency characteristic in the processor 21. The processor 21 has functions to, as mentioned above, reconstructs the wave-height data recorded in the waveform recording memory 15 according to the delay time for regenerating the eye pattern of the received signal and further to calculate, on the basis of the frequency data on the received signal obtained by the FFT of that eye pattern and the reference data in the reference data memory 22, a difference between the frequency data [difference in amplitude component and difference in group delay (phase) component] for controlling the frequency characteristic (the group delay quantity of the phase shifter 52, the gain of the amplifier 53) of the equalization amplifier 5 so that the difference therebetween reaches a minimum.

That is, this processor 21 additionally has the following features:

(1) a function as an FFT section (Fourier-transform section) 211 for obtaining frequency data on received waveform data by means of FFT of the received waveform data acquired by the monitor circuit 8;

(2) a function as a difference calculating section 212 for calculating a difference in frequency characteristic (amplitude component and group delay component) on the basis of the frequency data obtained by the FFT section 211 and the frequency data of a reference waveform free from waveform degradation;

(3) a function as a compensation characteristic determining section 213 for obtaining a frequency characteristic (compensation characteristic) of the equalization amplifier 5 so that each of the differences in amplitude component and in group delay component, obtained by the difference calculating section 212, shows a minimum; and (4) a function as a control signal generating section 214 for generating a control signal to control the equalization amplifier 5 so that the equalization amplifier 5 has the frequency characteristic obtained by the compensation characteristic determining section 213.

The FFT section 211 and the difference calculating section 212 function as a calculating (arithmetic processing) means 210 to perform the FFT and the difference calculation. In addition, the calculating means 210 and the monitor circuit 8 realizes a function as a received signal waveform degradation detecting unit (received waveform degradation detecting means) for detecting waveform degradation (difference between received waveform data and reference waveform data) of the received signal.

Furthermore, the D/A converter 23 is for converting a control signal (analog signal) for controlling the frequency characteristic of the equalization amplifier 5, produced in the processor 21 (control signal generating section 214), into a digital signal which in turn, is supplied to the equalization amplifier 5.

Figure 4:
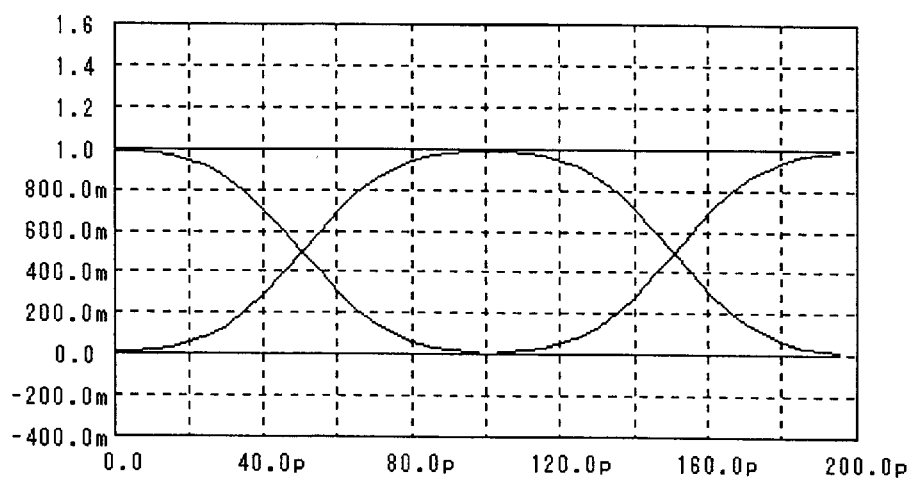
FIG. 4 is an illustration of one example of a reference waveform to be used in the optical receiving apparatus shown in FIG. 1.

In this embodiment, for example, when a received signal is a 10-Gb/s NRZ (Non Return to Zero) signal, as the aforesaid "reference waveform", it is possible to use a waveform, shown in FIG. 4, to be obtained by passing a square wave with 10 Gb/s and with DUTY:100% through a fourth-order Bessel-Tomson filter with a cutoff frequency of 7 GHz.

It is acceptable that either the frequency data before the FFT or the frequency data after the FFT is stored as the "reference data" in the aforesaid reference data memory 22. However, in the case of the storage of the frequency data before the FFT, for the coincidence of the data condition, the "reference data" is also required to undergo the FFT before the aforesaid difference calculation.

A detailed description will be given hereinbelow of a basic operation of the optical receiving apparatus 1 thus constructed according to this embodiment.

First, an optical signal transmitted through the optical transmission line 30 is converted into a current signal by the photo-detecting device 2 and current/voltage-converted by the preamplifier 3, and then inputted to the equalization amplifier 5. The equalization amplifier 5 amplifies the received signal (electric signal) and then outputs it to the clock recovery unit 6, the decision unit 7 and the monitor circuit 8. The clock recovery unit 6 regenerates, from the received signal inputted from the equalization amplifier 5, a reference clock synchronized with the received waveform thereof.

The reference clock regenerated is fed to the decision unit 7, the monitor circuit 8 (divider 11) and the signal processing section (not shown). The decision unit 7 identifies/regenerates the output of the equalization amplifier 5 on the basis of the reference clock fed from the clock recovery unit 6 in this way, then outputting it to the aforesaid signal processing section.

Figure 5:
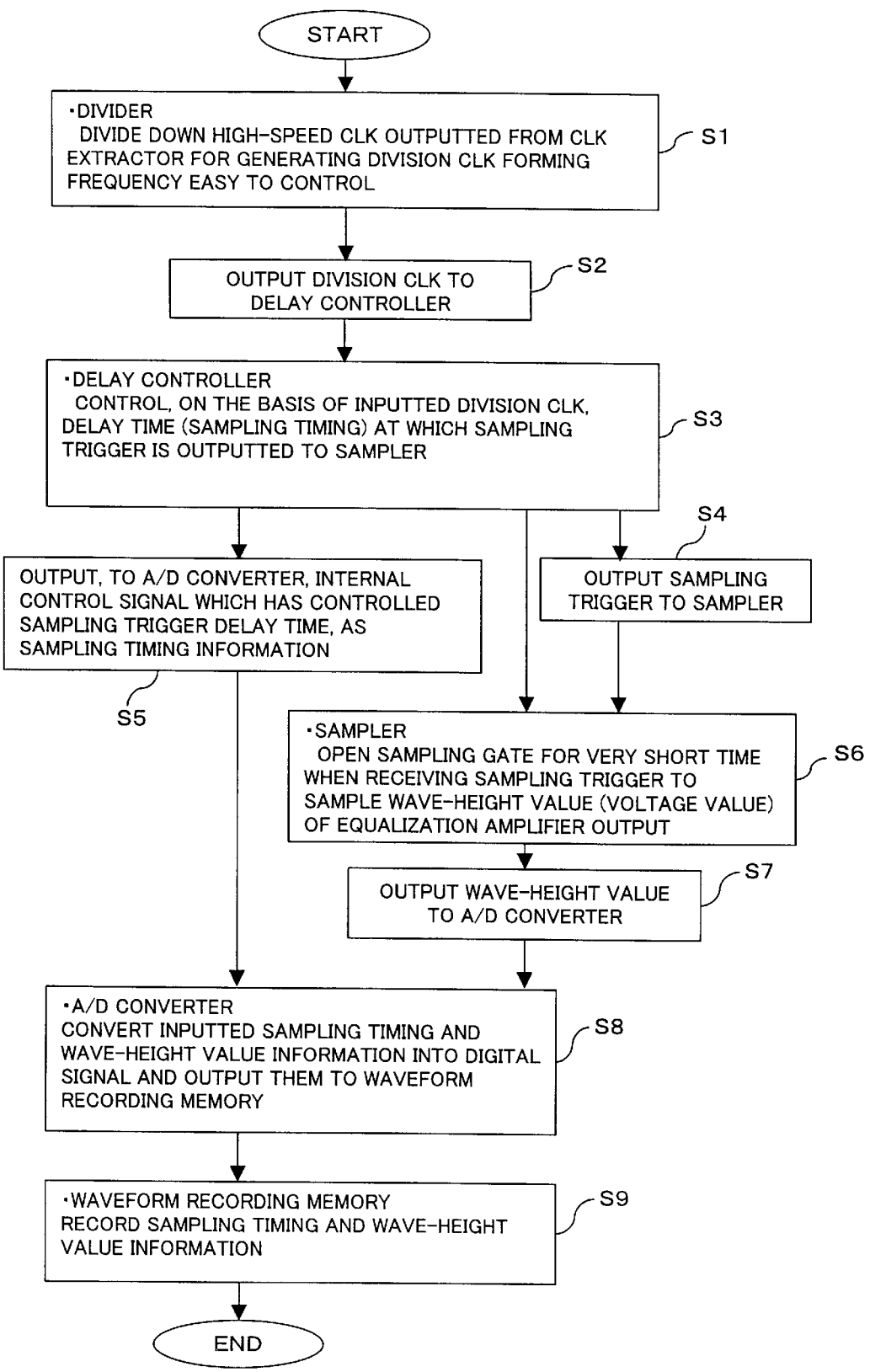
FIG. 5 is a flow chart useful for explaining an operation of the optical receiving apparatus (equalization-amplified waveform monitor circuit) shown in FIG. 1.

On the other hand, at this time, as FIG. 5 shows, in the monitor circuit 8, the reference clock from the clock recovery unit 6 is divided down by the divider 11 (dividing process), thereby generating an operational clock (which will equally be referred to hereinafter as a "division clock") producing a frequency which facilitates easy equivalent time sampling control (step S1; sampling timing generating process).

This division clock is inputted to the delay controller 12 (step S2), and the delay controller 12 changes the output timing of the division clock (delays by very short time) [step S3; sampling timing shift (delay control) process], and supplies it as a trigger output (sampling timing; which will equally be referred to hereinafter as "sampling trigger") to the sampler 13 (step S4), and outputs the delay value at that time as sampling timing information (an internal control signal which has controlled the delay time of the sampling trigger) to the A/D converter 14 (step S5).

The sampler 13 opens a sampling gate (not shown), that is, conducts the output (which sometimes will be referred to hereinafter as an "equalization amplification output") of the equalization amplifier 5, for only a very short time in response to each sampling trigger from the delay controller 12 to sample the wave-height data (sampling point; voltage value) on the equalization amplification output [step S6; (equivalent-time) sampling process] and output the wave-height data to the A/D converter 14 (step S7).

The A/D converter 14 converts the aforesaid delay time (sampling timing information) inputted from the delay controller 12 and the wave-height data inputted from the sampler 13 into digital signals and records them in the waveform recording memory 15 [steps S8 and S9; waveform data recording process (the above description relates to a received waveform measuring process). Thus, an eye pattern of the received signal corresponding to the delay time is recorded in the waveform recording memory 15 (see FIG. 7).

Figure 6:
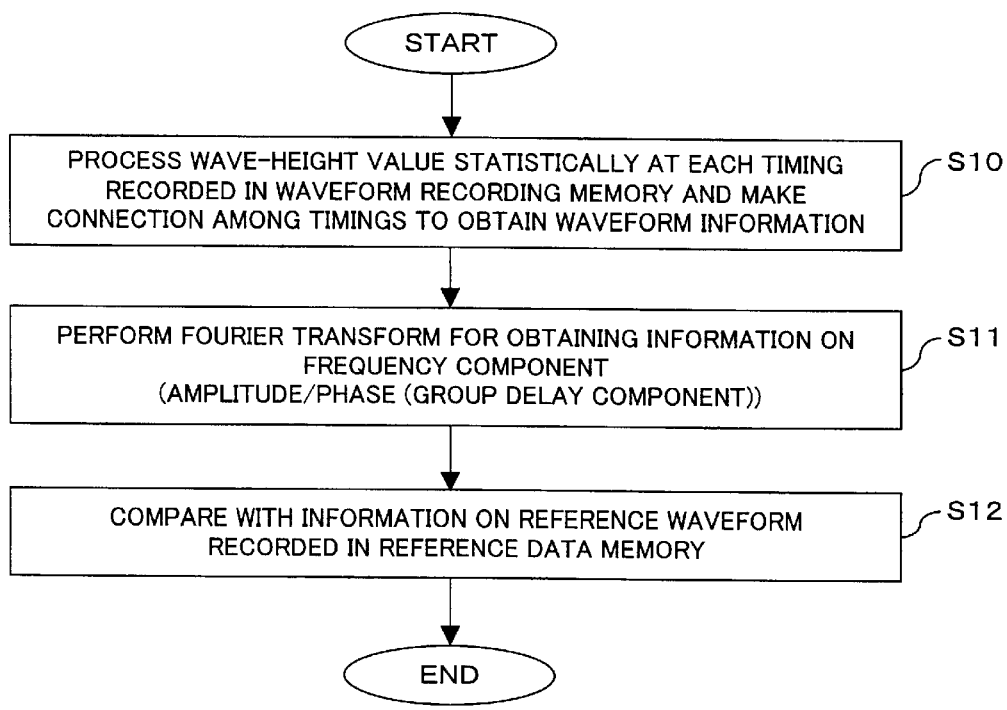
FIG. 6 is a flow chart useful for explaining an operation [statistics (waveform regeneration)/comparison processing] of the optical receiving apparatus (control circuit) shown in FIG. 1.
Figure 8:
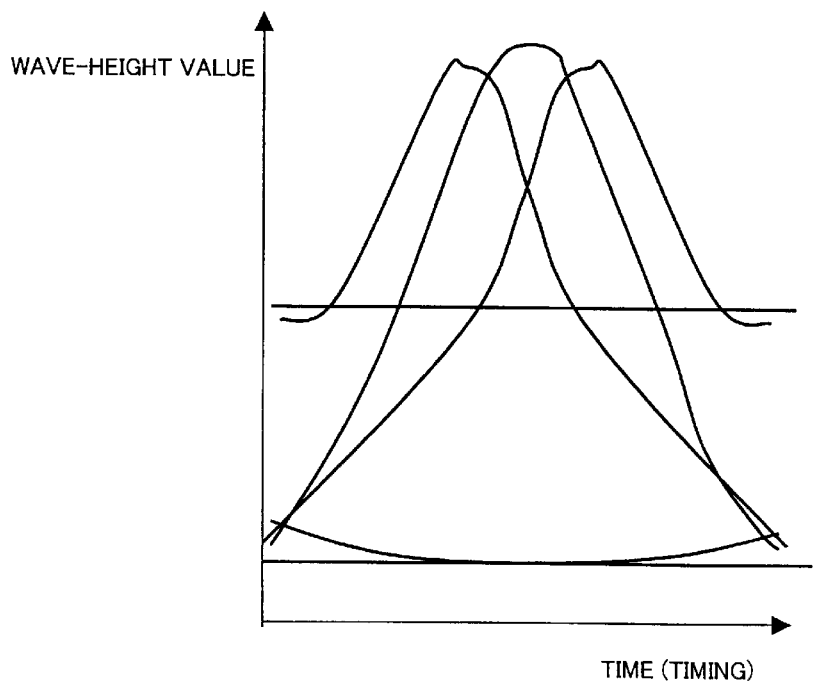
FIG. 8 is an illustrative view showing one example of a received waveform regenerated from through statistics processing in FIG. 1.

Secondly, in the control circuit 9, as FIG. 6 shows, the processor 21 statistically processes the wave-height data at each sampling timing (delay time) recorded in the waveform recording memory 15 to acquire (reconstruct) received waveform data by connecting the wave-height data at the respective timings (see FIG. 8; step S10). In addition, the processor 21 (FFT section 211) obtains the frequency data [(amplitude) component and group delay (phase) component] of the received waveform by performing the FFT of the acquired received waveform data (step S11).

Figure 9A:
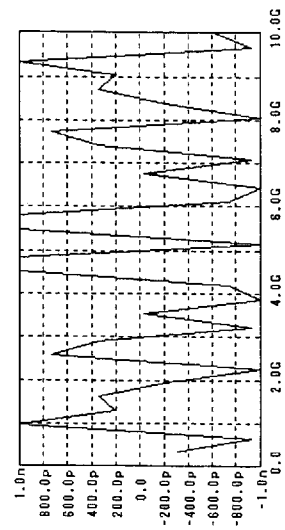
FIG. 9A is an illustration of a reference waveform.
Figure 9B:
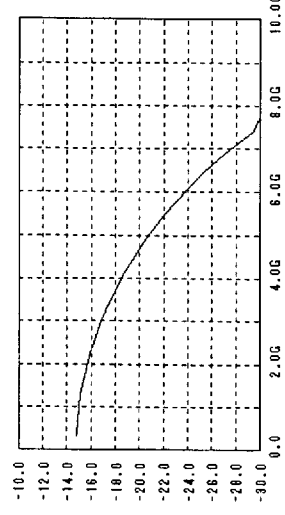
FIG. 9B is an illustration of a frequency (amplitude) component of the reference waveform shown in FIG. 9A.
Figure 9C:
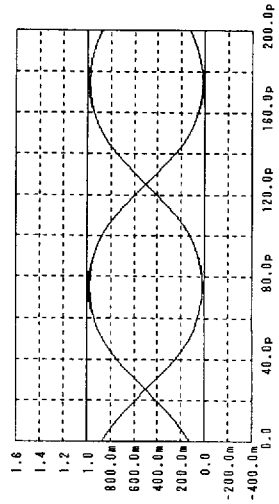
FIG. 9C is an illustration of a group delay (phase) component of the reference waveform shown in FIG. 9A.
Figure 9D:
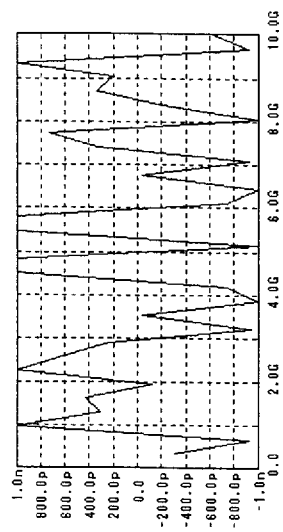
FIG. 9D is an illustration of a received waveform subjected to waveform degradation.
Figure 9E:
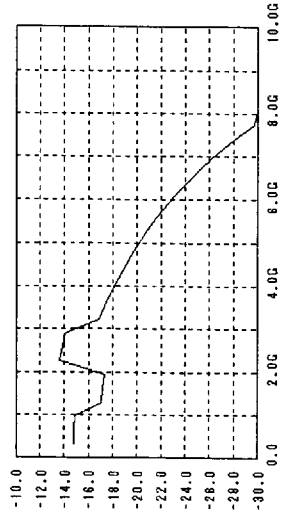
FIG. 9E is an illustration of a frequency (amplitude) component of the received waveform shown in FIG. 9D.
Figure 9F:
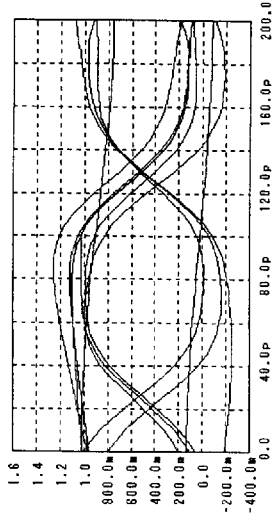
FIG. 9F is an illustration of a group delay (phase) component of the received waveform shown in FIG. 9D.

For example, assuming that the received waveform reconstructed as mentioned above shows a waveform shown in FIG. 9D, when the waveform shown in FIG. 9D is FFT-processed in the processor 21, an amplitude component shown in FIG. 9E and a group delay component shown in FIG. 9F are obtainable [in other words, the waveform shown in FIG. 9D has the amplitude component shown in FIG. 9E and the group delay component shown in FIG. 9F].

Furthermore, the processor 21 (difference calculating section 212) makes a comparison between the amplitude component and group delay component of the received waveform thus obtained and an amplitude component (see FIG. 9B) and group delay component (see FIG. 9C) of a reference waveform (see FIG. 9A) previously stored in the reference data memory 22 at every divided band stated above, thus calculating a difference between the amplitude components and a difference between the group delay components according to divided band (step S12, step S13 in FIG. 11; difference calculating process) This calculation of each difference corresponds to the detection of a degradation degree of the eye aperture of the received signal.

Figure 10A:
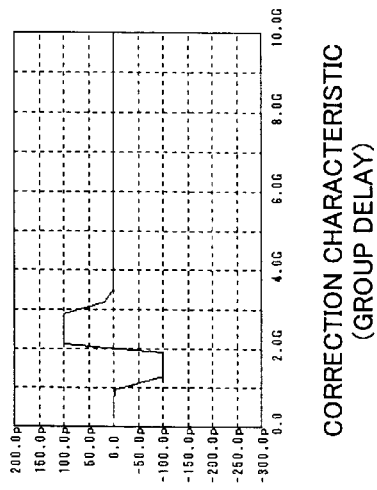
FIG. 10A is an illustration of a correction characteristic of a frequency (amplitude) component of a received waveform to be obtained by the comparison between the waveforms shown in FIGS. 9B and 9E.
Figure 10B:
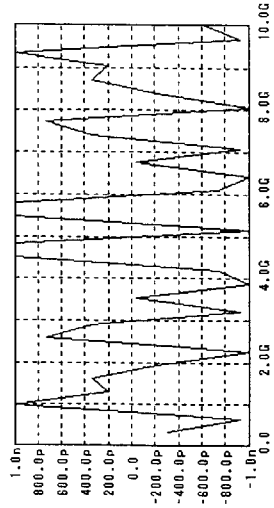
FIG. 10B is an illustration of a correction characteristic of a group delay (phase) component of the received waveform to be obtained by the comparison between the waveforms shown in FIGS. 9C and 9F.
Figure 11:
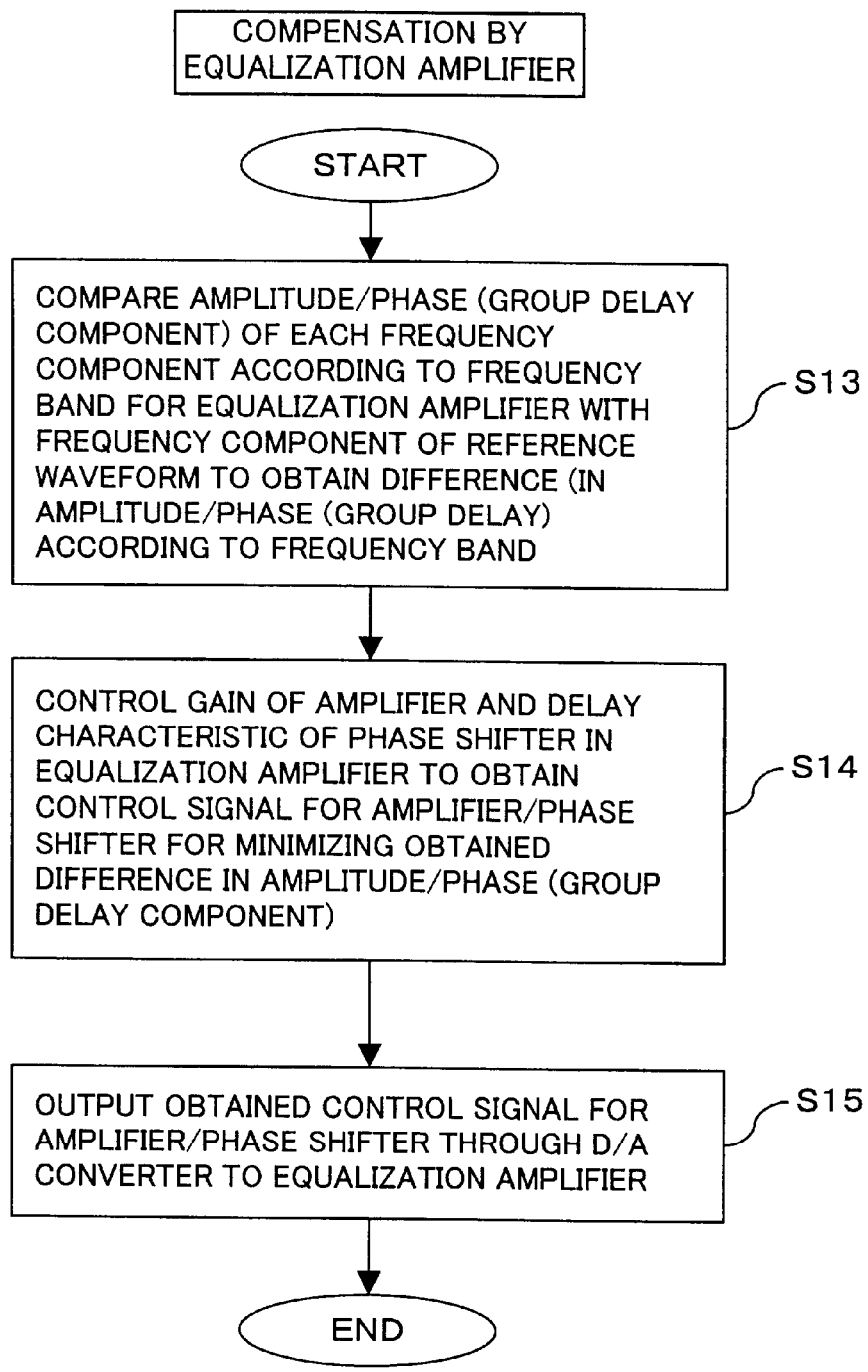
FIG. 11 is a flow chart useful for explaining an operation (dispersion compensation quantity determination, compensation control by equalization amplifier) of the optical receiving apparatus (control circuit) shown in FIG. 1.

Still furthermore, as FIG. 11 shows, the processor 21 obtains correction characteristics (for example, see FIGS. 10A and 10B) on the amplitude component and the group delay component to minimize the differences in amplitude component and in group delay component, calculated according to divided band as mentioned above (compensation characteristic determining process), and generates a control signal (digital signal) for controlling the frequency characteristic of the equalization amplifier 5, i.e., the group delay quantity of the phase shifter 52 and the gain of the amplifier 53, individually (step S14; control signal generating process).

Figure 10C:
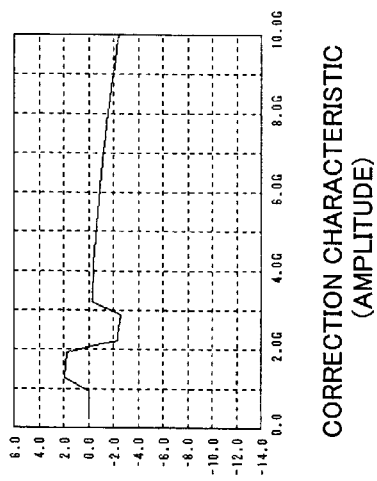
FIG. 10C is an illustration of the received waveform after the compensation based on the correction characteristics shown in FIGS. 10A and 10B.
Figure 10D:
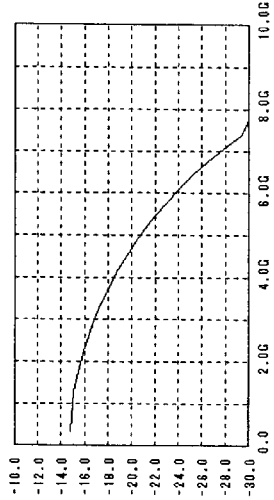
FIG. 10D is an illustration of a frequency (amplitude) component of the received waveform shown in FIG. 10C.
Figure 10E:
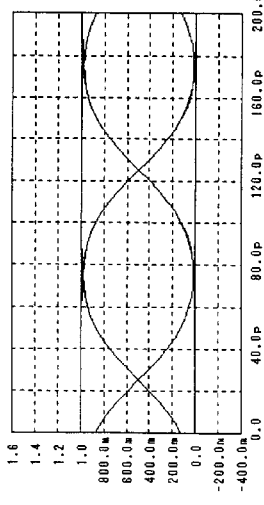
FIG. 10E is an illustration of a group delay (phase) component of the received waveform shown in FIG. 10C.

Moreover, the control signal generated as mentioned above is converted into an analog signal by the D/A converter 23 and inputted to the corresponding (control-needed) phase shifter 52 and/or amplifier 53 of the equalization amplifier 5 (step S15), thereby controlling the frequency characteristic of the equalization amplifier 5 for compensating for the waveform degradation of the received signal stemming from the optical transmission line 30 as shown in FIGS. 10C to 10E (enlarging the eye aperture of the received signal; control process).

FIG. 10C shows a received waveform after the compensation for waveform degradation, FIG. 10D shows an amplitude component of the waveform degradation compensated received waveform shown in FIG. 10C, and FIG. 10E illustrates a group delay component of the waveform degradation compensated received waveform shown in FIG. 10C. In this case, it is not always necessary to implement the above-mentioned difference calculation and frequency characteristic control of the equalization amplifier 5 at all times. It is also possible to implement them intermittently or at a constant interval (for example, at an interval of 1 to several minutes). This applies to the following description. In this case, as an advantage, it is possible to lighten the burden of the processor 21.

As described above, in the receiving apparatus 1 according to this embodiment, it is possible to compensate for (enlarge) the waveform degradation (eye aperture) of a received signal by detecting the waveform degradation degree (eye aperture) and controlling the frequency characteristic of the equalization amplifier 5, which enlarges the range of chromatic dispersion value allowable to the optical receiver 4 (that is, improving the reception sensitivity characteristic to lengthen the acceptable optical transmission distance), thus realizing and providing a low-priced and high-performance optical receiving apparatus 1 without using a dispersion compensation fiber (DCF).

In addition, since the chromatic dispersion value range allowable to the optical receiver 4 is enlargeable, one type of optical receiver 4 can cope flexibly with a plurality of types of optical transmission lines (for example, SMF, DSF and others) and with the waveform degradation (dispersion compensation quantity) according to transmission distance, which leads to considerably lowering the cost at the construction of an optical transmission system and the maintenance/management cost after the construction thereof.

Still additionally, since the above-described optical receiving apparatus 1 can detect and compensate for the actual waveform degradation degree of a received signal in real time, in the case of ultra-high-speed optical transmission exceeding 10 Gb/s, even if the waveform degradation stemming from the chromatic dispersion, a received signal suffers, varies due to variations of the chromatic dispersion characteristic of the optical transmission line 30 originating from microscopic external factors such as temperature variations, the apparatus 1 is followable to the variations.

Moreover, since the processor 21 can univocally determine the optimum frequency characteristic of the equalization amplifier 5 which minimizes the differences in frequency characteristic (amplitude and group delay), for example, as compared with a case in which the quality of a received signal is monitored on the basis of a bit error rate (BER) of a received signal so that compensation control is executed to bring the quality to a predetermined degree, there is no need to conduct a sweeping operation for obtaining the optimum frequency characteristic of the equalization amplifier 5, and for this reason, fast and certain compensation control becomes possible.

Still moreover, the monitor circuit 8 acquires a plurality of wave-height data through equivalent-time sampling (a reference clock synchronized with a received signal is divided down in the divider 11 and the divided clock is fed as a sampling timing to the sampler 13 while being shifted (delayed) periodically in the delay controller 12) of a received signal (equalization amplification output) and records the acquired wave-height data as received waveform data (eye pattern of the received signal) in the waveform recording memory 15; therefore, irrespective of the reference clock rate (frequency), it is possible to generate a sampling timing on the basis of an appropriate operational clock in the apparatus at all times.

Accordingly, it is possible to ensure certain recording/ measurement of received waveform data even in a case in which the received signal is an ultra-high-speed signal exceeding 10 Gb/s, so satisfactory compensation control is executable also for high-speed signals.

In particular, since the divider 11 and the delay controller 12 are used as mentioned above, although a divider capable of dividing down into integer (N) times is put to use, it is possible to output a sampling timing at an arbitrary timing owing to the delay control in the delay controller 12; whereupon, an equivalent-time sampling section 10 having an extremely high flexibility is realizable with a simple arrangement.

(A-2) Description of Modification of Basic Mode

Figure 12:
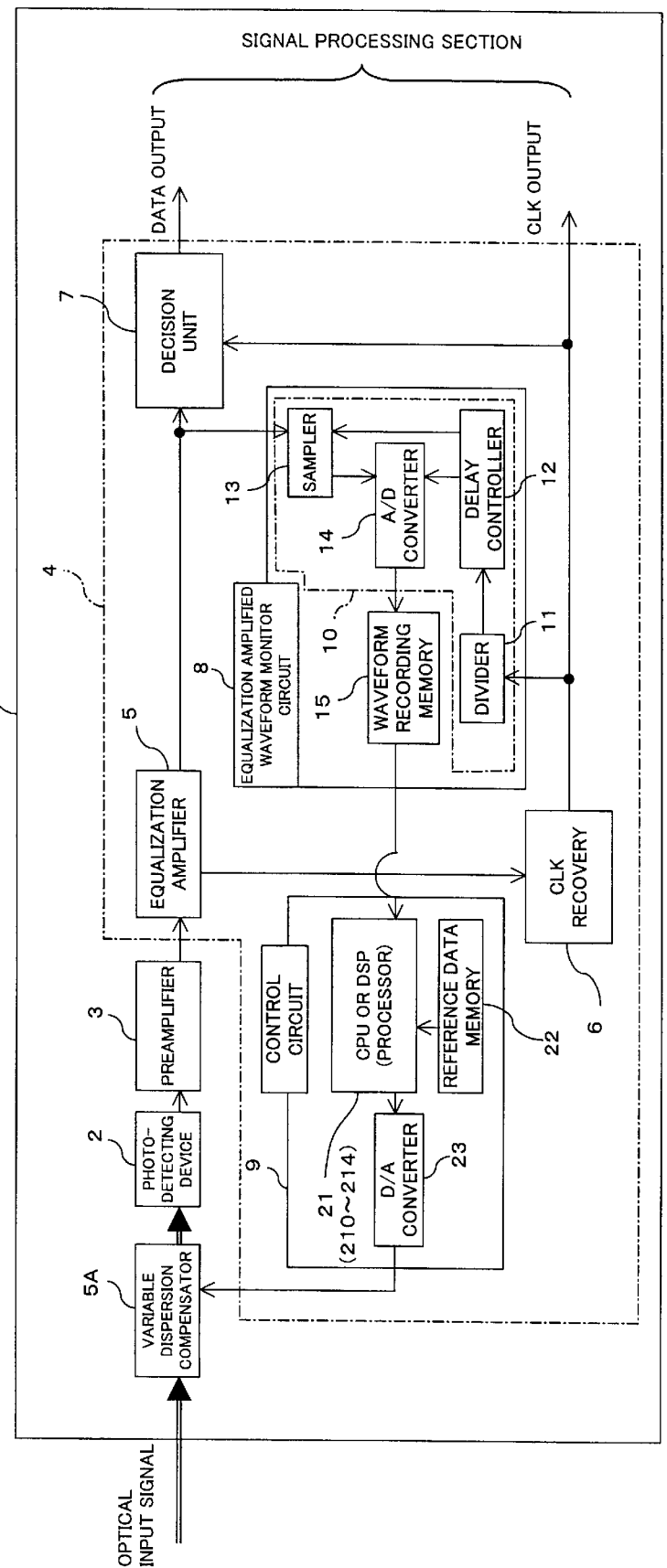
FIG. 12 is a block diagram showing a modification of the optical receiving apparatus according to the basic mode shown in FIG. 1.

In the optical receiving apparatus 1 according to the above-described basic mode, as the compensation characteristic variable type waveform degradation compensating means, the frequency characteristic variable equalization amplifier 5 is used and the frequency characteristic thereof is controlled to compensate for waveform degradation arising from chromatic dispersion of a received signal, although it is also possible to construct an optical receiving apparatus 1 for the compensation for the waveform degradation in a manner that, for example, as shown in FIG. 12, a variable optical dispersion compensator 5A having a variable chromatic dispersion characteristic is provided in the former stage of the aforesaid photo-detecting device 2 so that the chromatic dispersion characteristic thereof is controlled by the control circuit 9.

Incidentally, as the variable optical dispersion compensator (which will equally be referred to hereinafter as a "variable dispersion compensator") 5A, a well-known device is available, for example, it can be of a type using a diffraction grating, an AWG (Arrayed Wave-Guide) filter, a Bragg reflection filter (fiber grating) or the like. This is also valid for the following description. In FIG. 12, the same reference numerals as those used above represent the same or corresponding parts, unless otherwise specified particularly.

In this configuration, the waveform recording processing (steps S1 to S9 in FIG. 5) in the monitor circuit 9 and the difference detecting processing (steps S10 to S12 in FIG. 6) in the control circuit 9 are similar to those in the basic mode.

That is, in the monitor circuit 8, a reference clock inputted from the clock recovery unit 6 is divided down by the divider 11 and the divided clock is delay-controlled to shift the sampling trigger to be fed to the sampler 13.

In addition, the sampler 13 samples the equalization amplification output according to input of the sampling trigger to acquire wave-height data. The acquired wave-height data, together with the delay value, is converted into a digital signal in the A/D converter 14 and then recorded in the waveform recording memory 15.

Figure 13:
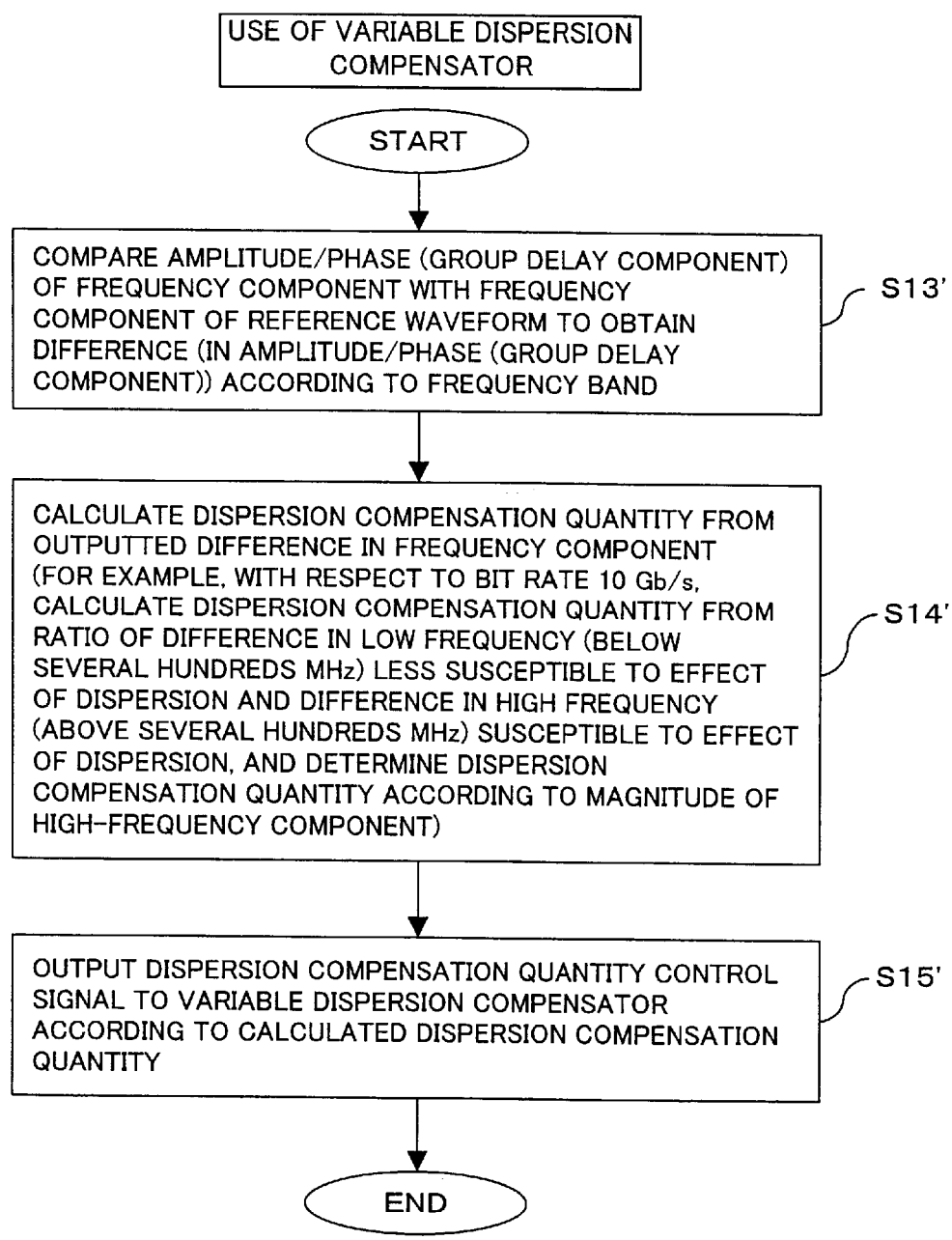
FIG. 13 is a flow chart useful for explaining an operation (dispersion compensation quantity determination, compensation control by a variable optical dispersion compensator) of the optical receiving apparatus (control circuit) shown in FIG. 12.

Following this, in the control circuit 9, the processor 21 (FFT section 211) reads out wave-height data from the waveform recording memory 15 to reconstruct the eye pattern of the received signal through statistical processing for obtaining an amplitude component and group delay component of the received signal according to divided band mentioned above, through the FFT. In addition, as FIG. 13 shows, the processor 21 (difference calculating section 212) compares each of the obtained components and the frequency data (amplitude component and group delay component) on the reference waveform recorded previously in the reference data memory 22 for calculating a difference therebetween (step S13').

Subsequently, the processor 21 (compensation characteristic determining section 213) calculates a dispersion compensation quantity or degree on the basis of the tendency of the differences. For example, with respect to a received signal whose bit rate is 10 Gb/s, a chromatic dispersion quantity correction value (dispersion compensation characteristic of the variable dispersion compensator 5A), which compensates optimally for a waveform degradation the received signal suffers, is calculated on the basis of the ratio of the difference in low-frequency (for example, below several hundreds MHz) component less susceptible to the effect of the chromatic dispersion and the difference in high-frequency (for example, several hundreds MHz or more) component susceptible to the effect of the chromatic dispersion (step S14').

Figure 21A:
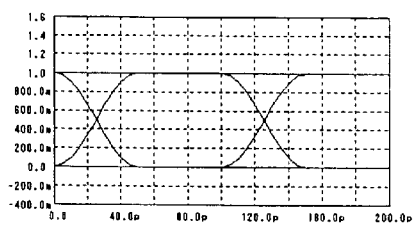
FIG. 21A is an illustration of an original transmitted waveform.
Figure 21B:
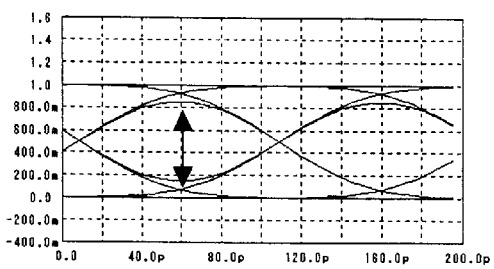
FIGS. 21B and 21C are illustrations of examples of waveforms received with the transmitted waveform shown in FIG. 21A being subjected to waveform degradation.
Figure 21C:
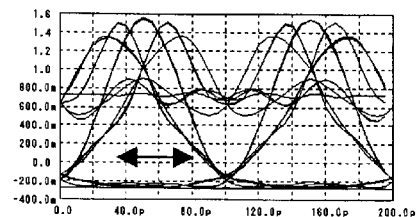

That is, when the difference in the high-frequency component is relatively larger than the difference in the low-frequency component, it is estimated that the eye aperture in the phase direction becomes smaller (phase is compressed; see FIG. 21C) with respect to the original transmitted waveform (for example, see FIG. 21A), and in the contrary case, it is estimated that the eye aperture in the amplitude direction becomes smaller (waveform is rounded; see FIG. 21B), and the processor 21 determines a compensation quantity (correction value) accordingly.

For example, in a case in which optical transmission is made in an optical transmission band of 1.55 $\mu$m through the use of SMF of 1.3-$\mu$m zero dispersion wavelength band, when the chirping is set such that the rising of the waveform is on the short-wavelength side (the falling thereof is on the long-wavelength side) as mentioned above, the long-wavelength side is strongly susceptible to the effect of the chromatic dispersion so that the waveform is rounded, and hence, the dispersion compensation quantity is set as a plus correction value. On the other hand, when the chirping setting is made conversely, it assumes a minus correction value.

In addition, the processor 21 (control signal generating section 214) generates a dispersion compensation control signal on the basis of the dispersion compensation quantity correction value (digital value) obtained (determined) as mentioned above, with this control signal being converted into an analog signal by the D/A converter 23 to be inputted as a dispersion compensation control signal to the variable dispersion compensator 5A (step S15'). Thus, the waveform degradation of an optical signal received through the optical transmission line 30, stemming from the chromatic dispersion, can be compensated for in the variable dispersion compensator 5A at the optical stage before the photo-electric conversion in the photo-detecting device 2.

Accordingly, the advantages and effects similar to those of the optical receiving apparatus 1 according to the above-described basic mode are obtainable, and in this case, since the compensation is made before the conversion of a received optical signal into an electric signal in the photo-detecting device 2, the eye aperture of an optical waveform inputted to the photo-detecting device 2 is maintainable in a large condition and as compared with the above-described basic mode, the chromatic dispersion value range allowable to the optical receiver 4 is further enlargeable. In consequence, the reception sensitivity characteristic of the optical receiver 4 is further improvable.

(B) Application to WDM Optical Transmission System

A description will be given hereinbelow of cases (first to fourth embodiments) in which the optical receiver 4 (waveform degradation compensating method) according to the above-described basic mode (or modifications thereof) is applied to an optical receiving apparatus for use in a WDM optical transmission system designed to transmit a wavelength-multiplexed optical signal (WDM signal) made by multiplexing a plurality of types of wavelengths (channels) $\lambda 1$ to $\lambda n$ (n represents an integer equal to or more than two, for example, n=32, 64, 128, . . . ). Also in the first to fourth embodiments which will be described hereinbelow, the parts marked with the same reference numerals as those used above are the same as or similar to the parts described above, unless otherwise specified particularly.

(B-1) First Embodiment

Figure 14:
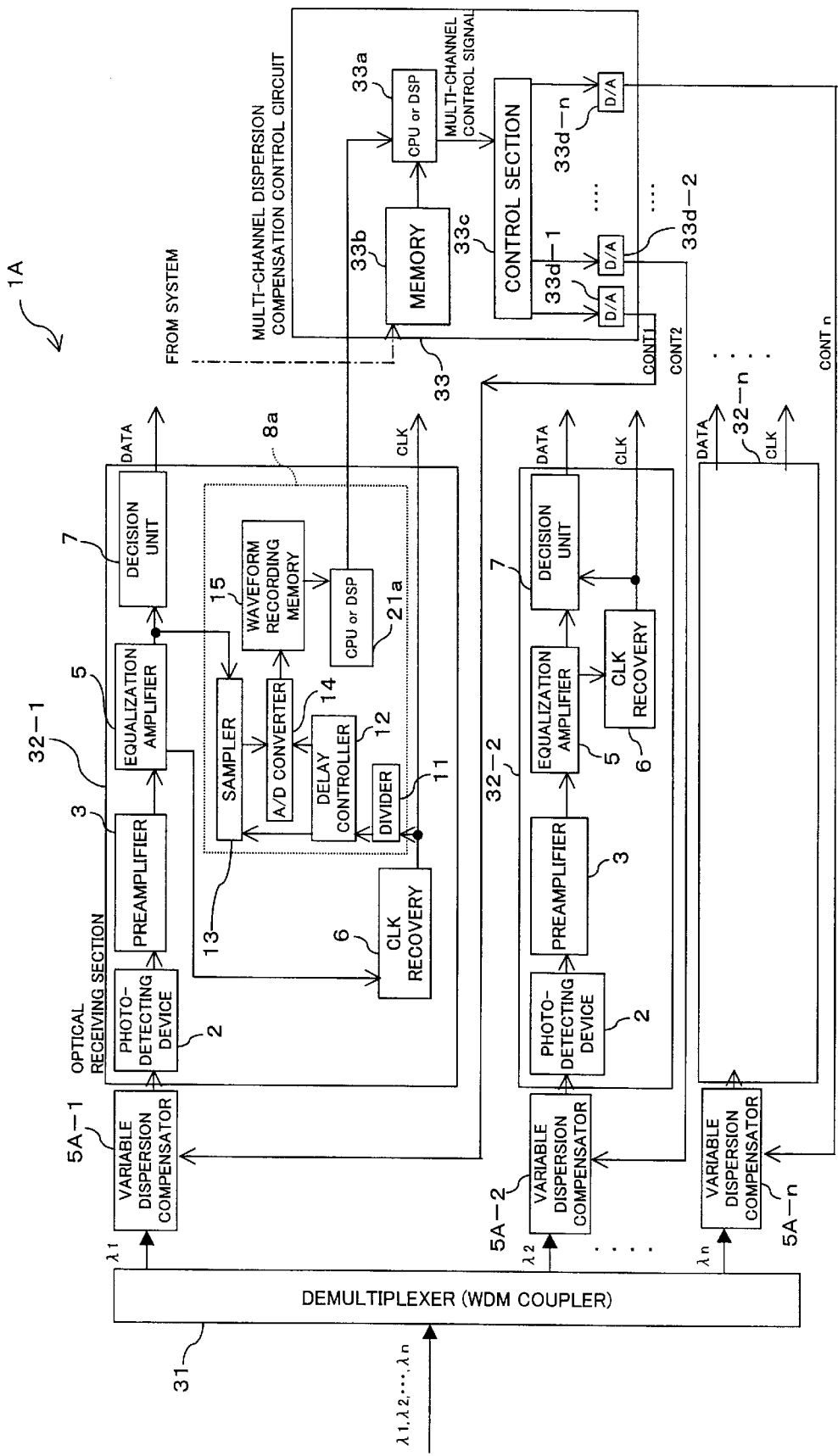
FIG. 14 is a block diagram showing a configuration of an essential part of an optical receiving apparatus according to a first embodiment of the present invention, which is applicable to a WDM optical transmission system.

FIG. 14 is a block diagram showing a configuration of an essential part of an optical receiving apparatus according to a first embodiment of the present invention. As FIG. 14 shows, an optical receiving apparatus 1A is made up of a WDM coupler (demultiplexer) 31 for demultiplexing a WDM signal from an optical transmission line 30 according to wavelength $\lambda i$ (i=1 to n), a plurality of variable dispersion compensators 5A-1 to 5A-n having a variable chromatic dispersion characteristic and provided with respect to the optical signals with the wavelengths $\lambda i$ before the photo-electric conversion in the photo-detecting device 2, respectively, a plurality of optical receiving sections 32-1 to 32-n provided with respect to these variable dispersion compensators 5A-i, and a multi-channel dispersion compensation control circuit 33 for individually controlling the chromatic dispersion characteristic of the corresponding variable dispersion compensator 5A-i according to wavelength $\lambda i$.

In addition, in this first embodiment, as FIG. 14 shows, at least one [the optical receiving section 32-1 for the wavelength $\lambda 1$ (specified wavelength)] of the optical receiving sections 32-1 to 32-n includes an equalization-amplified waveform monitor circuit 8a (which will hereinafter be referred to simply as a "monitor circuit 8a") comprising a divider 11, a delay controller 12, a sampler 13, an A/D converter 14, a waveform recording memory 15 and a processor 21a such as a CPU or DSP, while only components (a photo-detecting device 2, a preamplifier 3, an equalization amplifier 5, a clock recovery unit 6 and a decision unit 7) other than the monitor circuit 8a of this optical receiving section 32-1 are provided in each of the remaining optical receiving sections 32-2 to 32-n (however, in FIG. 14, the internal components of the optical receiving section 32-n are omitted from the illustration).

In this configuration, in the aforesaid monitor circuit 8a, the processor 21a is for taking charge of the reconstruction (step S10) of a received waveform (eye pattern), the FFT arithmetic processing (step S11) and the comparison processing with a reference waveform (step S12), for example, mentioned above with reference to FIG. 6. That is, in the monitor circuit 8a, the section other than this processor 21a corresponds to the aforesaid monitor circuit (received waveform measuring means; received signal waveform measuring unit) 8.

On the other hand, the multi-channel dispersion compensation control circuit 33 is composed of a processor 33a, an inter-channel data memory (which will hereinafter be referred to simply as a "memory") 33b such as a RAM, a control section 33c and a plurality of digital/analog (D/A) converters 33d-1 to 33d-n respectively provided with respect to wavelengths $\lambda i$. The memory 33b, as well as the aforesaid reference data memory 22, is for previously storing reference data (frequency data on a reference waveform) to be compared with a received waveform after FFT-processed, and is further for a dispersion compensation table 331 (see FIG. 15) showing the relationship in dispersion compensation quantity among channels.

Figure 22:
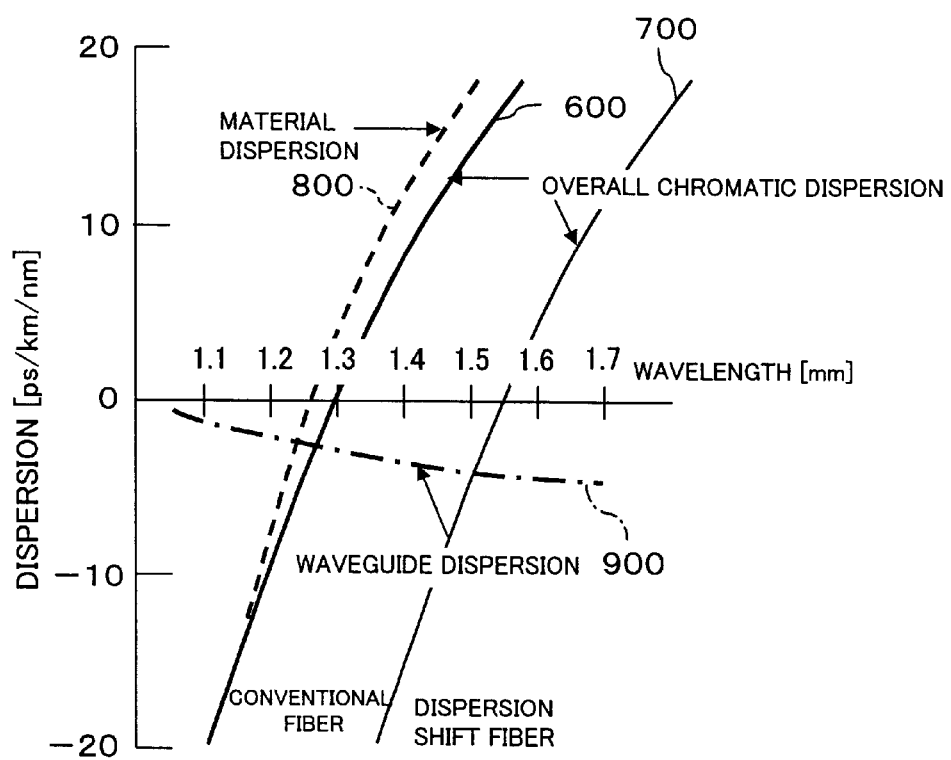
FIG. 22 is an illustration of examples of chromatic dispersion characteristics of a single-mode optical fiber (SMF) and a dispersion-shifted fiber (DSF).

In this case, the dispersion compensation table 331 is made out on the basis of information (type or the like) of an optical fiber for the optical transmission line 30, or information such as a transmission distance or wavelength spacing. As also seen from FIG. 22, the chromatic dispersion quantity each optical signal with a wavelength $\lambda i$ undergoes depends upon the type (SMF, DSF or the like) of the optical fiber, transmission distance and wavelength spacing and, hence, if these information are known in advance, when only a chromatic dispersion quantity corresponding to one wave is obtained (actually measured), the chromatic dispersion quantity on another channel is naturally determined therefrom. Accordingly, the dispersion compensation table 331 is made to retain, as data in a table format, the relationship between a chromatic dispersion quantity correction value for one wave and chromatic dispersion quantity correction values (or offset values) for other channels, acquired through simulation (or actual measurement) or the like.

Figure 16:
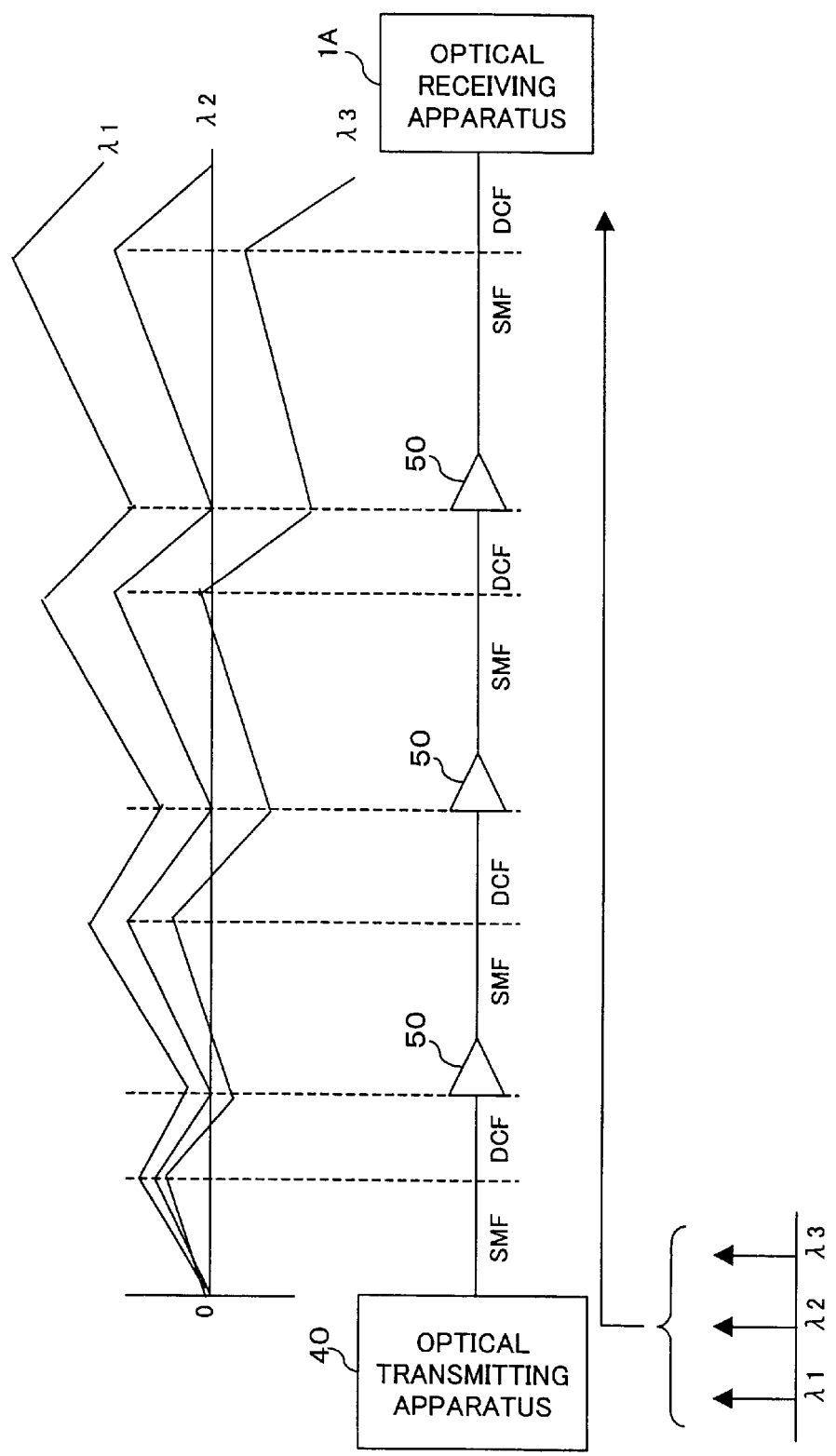
FIG. 16 is a block diagram useful for explaining a chromatic dispersion quantity a WDM signal receives in a WDM optical transmission system.

In this connection, for example, as shown in FIG. 16, in a case in which a WDM signal sent from an optical transmitting apparatus 40 is transmitted while the chromatic dispersion arising in an optical transmission line (in this case, SMF) is compensated for in a DCF in each repeat interval [reference numeral 50 designates an optical repeater (optical amplifier)], if the wavelength spaces among the wavelengths $\lambda 1$, $\lambda 2$ and $\lambda 3$ are set to be equal to each other, it has been known that, on the basis of the specified wavelength $\lambda 2$, the wavelengths $\lambda 1$ and $\lambda 3$ suffer the substantially same chromatic dispersion quantity.

In addition, it is also possible that data made out previously through the use of a system managing unit such as a maintenance terminal is stored as the dispersion compensation table 331 in the memory 33b, or that the aforesaid information on the optical fiber and information on transmission distance and wavelength spacing are inputted to the processor 33a so that the processor 33a makes out the dispersion compensation table 331 and puts it in the memory 33b.

The aforesaid processor 33a takes over the processing from the processor 21a on the monitor circuit 8a side and conducts the difference detection (difference calculation; step S13') and dispersion compensation quantity correction value determination (step S14') mentioned above with reference to FIG. 13, and further sees the aforesaid dispersion compensation table 331 on the basis of that correction value to obtain the dispersion compensation quality correction values on other wavelengths (channels) $\lambda 2$ to $\lambda n$ for generating a multi-channel control signal including correction value information on all the wavelengths $\lambda 1$ to $\lambda n$. Incidentally, it is also possible that this function of the processor 33a and the function of the processor 21a is unified to one side.

Moreover, the control section 33c is for generating, on the basis of the dispersion compensation quantity correction value information on each wavelength $\lambda i$ included in the multi-channel control signal generated by the processor 33a, a dispersion compensation control signal (CONT1-n; digital signal) for making the variable dispersion compensator 5A-i have a dispersion compensation characteristic corresponding to the correction value. Each of the D/A converters 33d-i is for converting the dispersion compensation control signal from this control section 33c into an analog signal, then supplying it to the corresponding variable dispersion compensator 5A-i.

That is, in this first embodiment, the processor 21a and the processor 33a take charge of realizing the functions of the aforesaid FFT section 211, difference calculating section 212, compensation characteristic determining section 213 and control signal generating section 214, while the monitor circuit 8a and the processor 33a [calculating means 210 (FFT section 211 and the difference calculating section 212) realize the functions of the aforesaid received signal waveform degradation detecting unit (received waveform degradation detecting means).

In addition, in this case, the processor 21a and the multi-channel dispersion compensation control circuit 33 function as an individual compensation control section (control means) to calculate the differences on all the wavelengths $\lambda 1$ to $\lambda n$ on the basis of the difference on a specified wavelength (in this case, wavelength $\lambda 1$) for individually controlling the chromatic dispersion compensation characteristic of each variable optical dispersion compensator 5A-$i$ so as to minimize each of the differences.

In this connection, it is also possible that the function of the aforesaid multi-channel dispersion compensation control circuit 33 is given unitarily to the monitor circuit 8a so that the optical receiving section 32-1 has that function.

With the above-described arrangement, in this optical recording apparatus 1A, as described in the basic mode, with respect to, of the respective wavelengths $\lambda 1$ to $\lambda n$, only one optical signal with one wave (in this case, $\lambda 1$), the equalization amplification output is monitored through the equivalent-time sampling, and the eye pattern of the received signal is recorded (see steps S1 to S9 in FIG. 5), and further the difference relative to the reference waveform is calculated through the FFT calculation to control the dispersion compensation characteristic of the variable dispersion compensator 5A-1 for all the wavelengths $\lambda 1$ to $\lambda n$ on the basis of the calculated difference for individually compensating for the waveform degradation on all the wavelengths $\lambda 1$ to $\lambda n$ (see steps S10 to S12 in FIG. 6 and Steps S13' to S15' in FIG. 13).

Accordingly, the advantages and effects similar to those of the above-mentioned modification according to the basic mode are obtainable, and in this case, the difference (waveform degradation) detecting system (monitor circuit 8a and dispersion compensation control circuit 33) is required only for one channel, thus realizing and providing a smaller-sized and lower-priced optical receiving apparatus 1A.

Incidentally, as a matter of course, it is also acceptable that the aforesaid monitor circuit 8a is provided in any one of the optical receiving sections 32-2 to 32-$n$ for the wavelengths $\lambda 2$ to $\lambda n$ other than the wavelength $\lambda 1$. In addition, it is also possible that the monitor circuit 8a is not provided only for one channel, but it is used for each of two or more channels or for each of all the channels. If the monitor circuits 8a are used for two or more channels, the apparatus scale becomes larger, but since the number of channels for the dispersion compensation quantity correction values to be estimated through the use of the dispersion compensation table 331 decreases (that is, it leads to an increase in the number of channels for which correction values are determined on the basis of the actual values), the compensation accuracy is improvable.

Moreover, in the above-described example, although the reference data memory 22 and the memory for storing the dispersion compensation table 331 are unified as the memory 33b, it is naturally possible that they are designed as separate memories. In the case of the use of the separate memories, for example, the reference data memory 22 is placed on the monitor circuit 8a side and the processor 21a makes a comparison between a received waveform and a reference waveform.

(B-2) Second Embodiment

Figure 17:
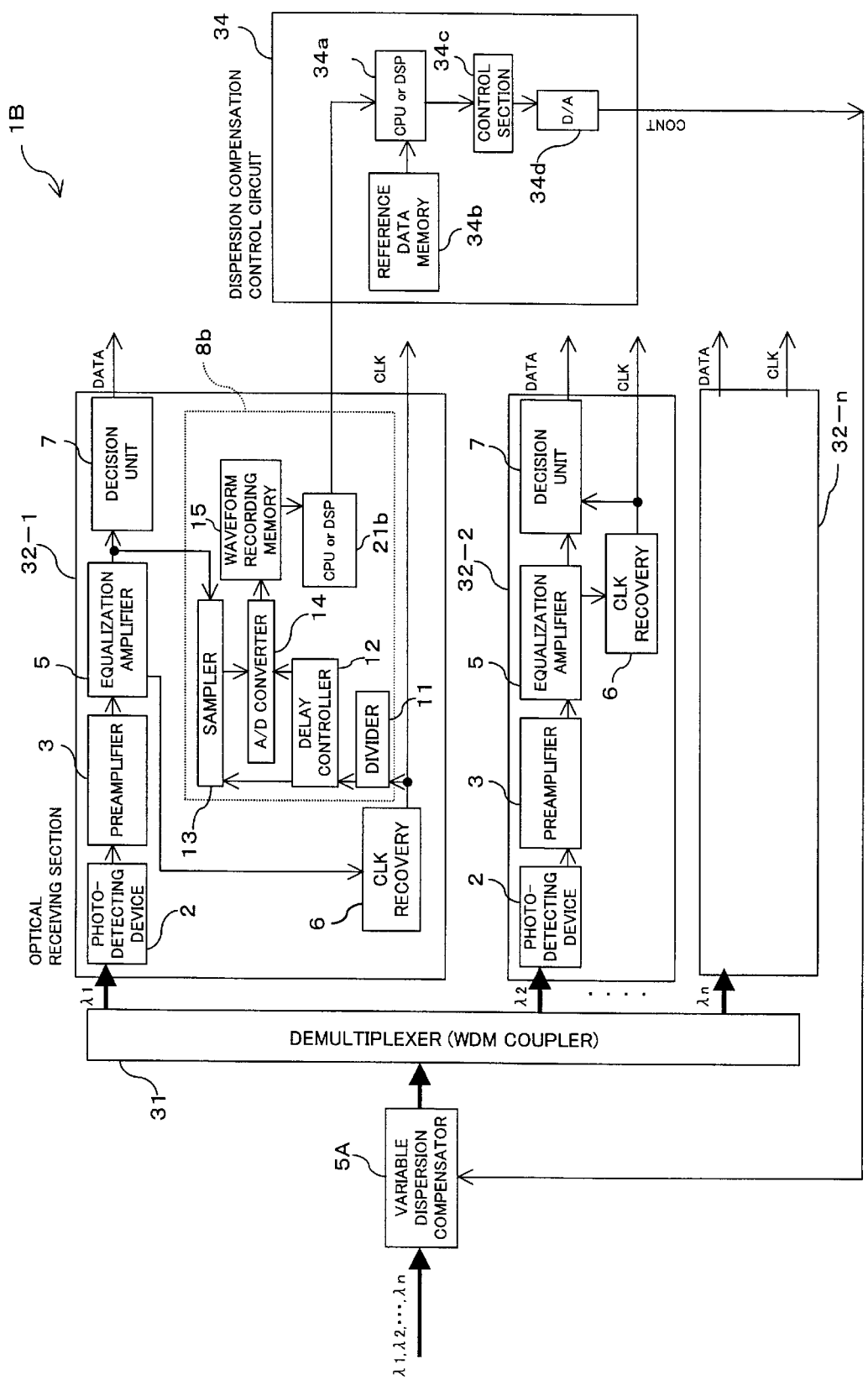
FIG. 17 is a block diagram showing a configuration of an essential part of an optical receiving apparatus according to a second embodiment of the present invention, which is applicable to a WDM optical transmission system.

FIG. 17 is a block diagram showing a configuration of an essential part of an optical receiving apparatus according to a second embodiment of the present invention. In FIG. 17, an optical receiving apparatus 1B is made up of a variable dispersion compensator 5A whose chromatic dispersion characteristic is variable, a WDM coupler (demultiplexer) 31 for demultiplexing a WDM signal from an optical transmission line 30 according to wavelength $\lambda i$, a plurality of optical receiving sections 32-1 to 32-$n$ respectively provided with respect to optical signals with the wavelengths $\lambda i$ after demultiplexed, and a dispersion compensation control circuit 34 for controlling a chromatic dispersion characteristic of the variable dispersion compensator 5A in common with respect to the wavelengths $\lambda i$.

In addition, in this second embodiment, of the optical receiving sections 32-1 to 32-$n$, the optical receiving section 32-1 for one channel (in this case, the wavelength $\lambda i$) includes an equalization amplified waveform monitor circuit 8b (which will hereinafter be referred to simply as a "monitor circuit 8b") comprising a divider 11, a delay controller 12, a sampler 13, an A/D converter 14, a waveform recording memory 15 and a processor 21b such as a CPU or DSP, and components (a photo-detecting device 2, a preamplifier 3, an equalization amplifier 5, a clock extractor 6 and a decision unit 7) other than the monitor circuit 8b of the optical receiving section 32-1 are provided in each of the remaining optical receiving sections 32-2 to 32-$n$ (in FIG. 17, the internal components of the optical receiving section 32-$n$ are omitted from the illustration).

Also in this case, in the monitor circuit 8b, the processor 21b takes charge of the reconstruction (step S10) of a received waveform (eye pattern), the FFT arithmetic processing (step S11) and the comparison (step S12) with a reference waveform, mentioned above with reference to FIG. 6. That is, also in this case, in the monitor circuit 8b, the section other than this processor 21b corresponds to the monitor circuit (received waveform measuring means; received signal waveform measuring unit) 8.

On the other hand, the dispersion compensation control circuit 34 includes a processor 34a, a reference data memory 34b, a control section 34c and a digital/analog (D/A) converter 34d. Also in this case, the reference data memory 34b is for storing reference data (frequency data on a reference waveform) to be compared with a received waveform after FFT-processed, and in this case, it is made to record, as reference waveform data, waveform data for the wavelength $\lambda 1$ when batch compensation is made for all the channels to accomplish the optimum dispersion compensation.

The processor 34a takes over the processing from the processor 21b and fulfills the functions to conduct the difference detection (step S13') and the correction value determination on the dispersion compensation quantity of the variable dispersion compensator 5A (step S14') mentioned above with reference to FIG. 13. Also in this case, the function of the processor 34a and the function of the processor 21b can be placed unitarily in one side.

The control section 34c is for generating a dispersion compensation control signal (digital signal) corresponding to the dispersion compensation quantity correction value obtained in the processor 34a, and the D/A converter 34d converts the dispersion compensation control signal generated in the control section 34c into an analog signal, then supplying it to the variable dispersion compensator 5A.

That is, in the second embodiment, the processor 21b and the processor 34a realize the functions of the above-mentioned calculating means 210 (FFT section 211, difference calculating section 212), the compensation characteristic determining section 213 and the control signal generating section 214, while the monitor 8b and the processor 34a [calculating means 210 (FFT section 211 and difference calculating section 212)] realizes the function of the aforesaid received signal waveform degradation detecting unit (received waveform degradation detecting means).

In addition, in this case, the processor 21b and the dispersion compensation control circuit 34 function as a batch compensation control section (control means) for batch-controlling the chromatic dispersion characteristic of the variable dispersion compensator 5A in common with respect to the wavelengths λ1 to λn. Incidentally, it is also possible to incorporate the function of the dispersion compensation control circuit 34 into the monitor circuit 8b and place the incorporated function in the optical receiving section 32-1.

With the above-described arrangement, in this optical receiving apparatus 1B, the equalization amplification output is monitored through the equivalent-time sampling, as described in the basic mode, with respect to, of optical signals having the wavelengths λ1 to λn, only an optical signal of one wave (in this case, λ1) to record an eye pattern of a received signal (see steps S1 to S9 in FIG. 5), and a difference from a reference waveform is obtained through the use of the FFT arithmetic processing to control the dispersion compensation characteristic of the variable dispersion compensator 5A on the basis of the obtained difference for compensating for the waveform degradation on all the wavelengths λ1 to λn (see steps S10 to S12 in FIG. 6 and steps S13' to S15' in FIG. 13).

Accordingly, the advantages and effects similar to those of the above-described basic mode and modification thereof are obtainable, and in this case, as compared with the optical receiving apparatus 1A described above with reference to FIG. 14, the variable dispersion compensator 5A required is one in number, and the scale of the dispersion compensation control circuit 34 itself is reducible because the D/A converters 34d-i for the respective wavelengths and others become unnecessary, which can realize an optical receiving apparatus 1B reduced in size as a whole and lowered in cost.

In particular, in this case, since the number of optical devices is reducible, it is possible to suppress the occurrence of the phenomenon causing the waveform degradation, such as polarization-mode conversion at connection points thereof, to the utmost, thus achieving further improvement of the compensation accuracy as compared with the above-described optical receiving apparatus 1A.

(B-3) Third Embodiment

Figure 18:
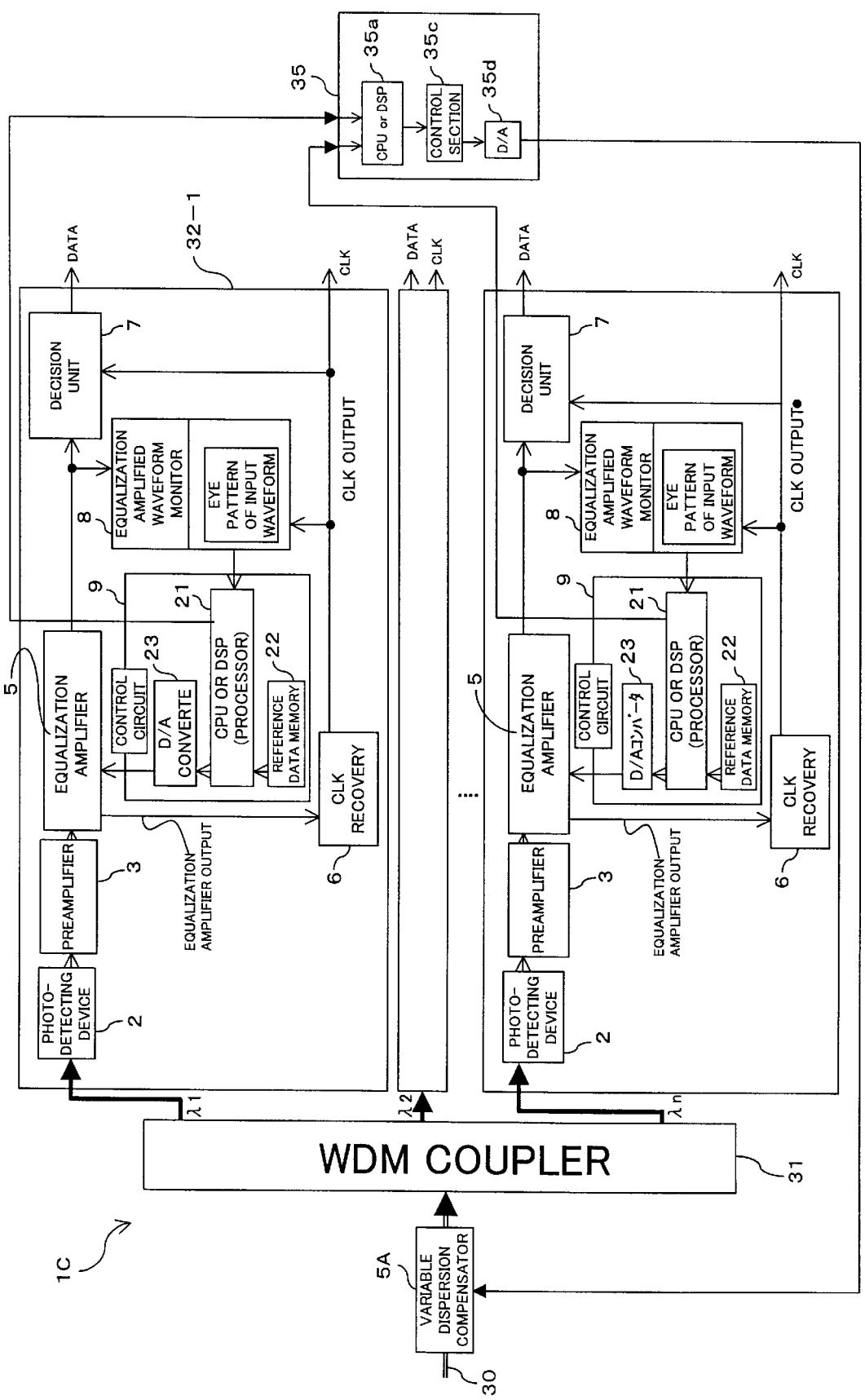
FIG. 18 is a block diagram showing a configuration of an essential part of an optical receiving apparatus according to a third embodiment of the present invention, which is applicable to a WDM optical transmission system.

FIG. 18 is a block diagram showing a configuration of an essential part of an optical receiving apparatus according to a third embodiment of the present invention. In FIG. 18, an optical receiving apparatus 1C is made up of a variable dispersion compensator 5A whose chromatic dispersion characteristic is variable, a WDM coupler (demultiplexer) 31 for demultiplexing a received WDM signal according to wavelength λi, a plurality of optical receiving sections 32-1 to 32-n respectively provided with respect to the wavelengths λi after demultiplexed, and a dispersion compensation control circuit 35.

In this third embodiment, each of the optical receiving sections 32-1 to 32-n includes a monitor circuit 8 (a divider 11, a delay controller 12, a sampler 13, an A/D converter 14, a waveform recording memory 15 and a processor 21 such as a CPU or DSP) and a control circuit 9 [a processor 21 (an FFT section 211, a difference calculating section 212, a compensation characteristic determining section 213, a control signal generating section 214), a reference data memory 22, a D/A converter 23], shown in FIG. 1, (in FIG. 18, the internal components of the optical receiving section 32-2 are omitted from the illustration).

On the other hand, the dispersion compensation control circuit 35 is composed of a processor 35a such as a CPU or DSP, a control section 35c and a digital/analog (D/A) converter 35d. The processor 35a receives information on a difference between a received waveform and a reference waveform, obtained in the processor 21 of each of the control circuits 9 of the optical receiving sections 32-1 and 32-n for two channels (wavelengths λ1 and λn), existing at both ends, of the optical receiving sections 32-1 to 32-n for performing a function to obtain the optimum (difference minimizing) dispersion compensation characteristic (correction value) of the variable dispersion compensator 5A on the basis of these information.

In this case, because of the acquisition of the differences with respect to both-end wavelengths λ1 and λn, the processor 35a can detect the slope of the chromatic dispersion characteristic additionally. Accordingly, when a device capable of changing not only the chromatic dispersion quantity but also the slope of the chromatic dispersion characteristic is applied to the variable dispersion compensator 5A, it is possible to additionally compensate for the slope of the chromatic dispersion characteristic (called "slope compensation"), thus realizing finer chromatic dispersion compensation.

The control section 35c is for generating a dispersion compensation control signal (digital signal) corresponding to a correction value of the chromatic dispersion quantity obtained by the processor 35a and the slope of the chromatic dispersion characteristic, while the D/A converter 35d is for converting the dispersion compensation control signal generated by the control section 35c into an analog signal, then supplying it to the variable dispersion compensator 5A.

That is, in this optical receiving apparatus 1C, the monitor circuit 8 and the processor 21 (calculating means 210), functioning as the aforesaid received signal waveform degradation detecting unit, are provided for each of all the wavelengths λ1 to λn, while the variable dispersion compensator 5A placed at the former stage of the WDM coupler 31 and the frequency characteristic variable type equalization amplifier 5 placed in conjunction with each of electric signals after the photoelectric conversion of demultiplexed optical signals by the WDM coupler 31 made in the photo-detecting device 2 realize a waveform degradation compensating means capable of compensating for the waveform degradation the received WDM signal suffers.

In addition, each of the control circuits 9 performs the function as an equalization amplifier control section to control the frequency characteristic of the corresponding equalization amplifier 5 to minimize the difference between a received waveform and a reference waveform detected by the corresponding waveform degradation detecting unit, while the dispersion compensation control circuit 35 fulfills the function as a batch compensation control section to batch-control the chromatic dispersion characteristic of the variable dispersion compensator 5A in common with respect to the wavelengths λ1 to λn on the basis of the differences on the specified wavelengths λ1 and λn. Moreover, these control circuits 9 and 35 realize a control means for controlling the compensation characteristics (chromatic dispersion characteristic and frequency characteristic) of the aforesaid variable dispersion compensator 5A and equalization amplifier 5 functioning as the waveform degradation compensating means.

Incidentally, the function of the dispersion compensation control circuit 35 can be placed unitarily in the function of the control circuit 9 so that the optical receiving section 32-1 or 32-2 has that function additionally.

Figure 7:
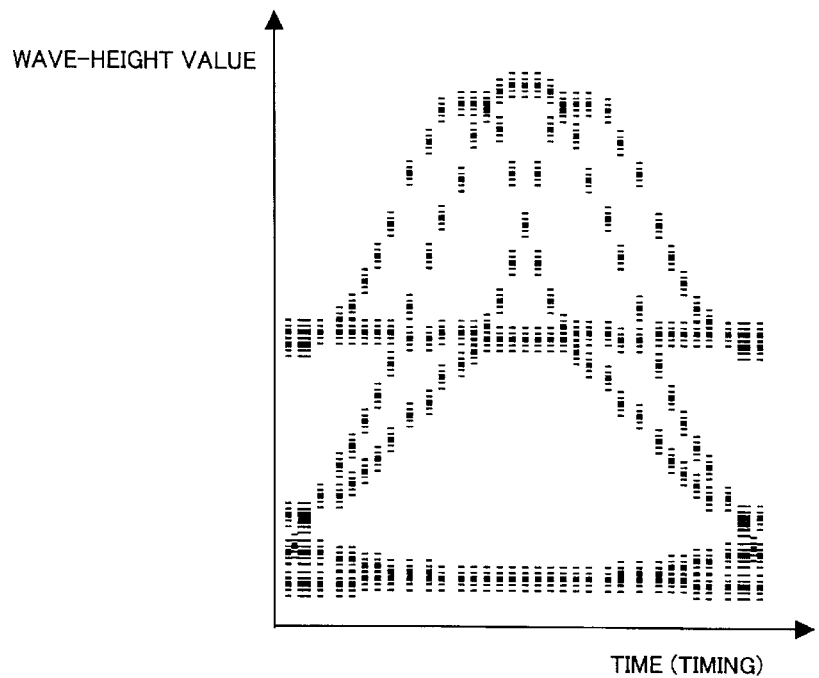
FIG. 7 is an illustrative view showing one example of wave-height data to be recorded in a waveform recording memory shown in FIG. 1.

With the above-described arrangement, in this optical receiving apparatus 1C, as mentioned above in the basic mode, with respect to each of the wavelengths λ1 to λn, the equalization amplification output is monitored through the equivalent-time sampling in the monitor circuit 8 to record the eye pattern of a received signal (see steps S1 to S9 in FIG. 5), and a difference from the frequency data of the reference waveform is obtained through the use of FFT to control the frequency characteristic of the equalization amplifier 5 on the basis of the obtained difference for electrically compensating individually for the waveform degradation of the wavelengths λ1 to λn (see steps S10 to S12 in FIG. 6 and steps S13 to S15 in FIG. 7).

Still additionally, the dispersion compensation control circuit 35 detects a correction value of the dispersion compensation quantity and a slope of the dispersion compensation characteristic so as to minimize the aforesaid difference, and supplies the corresponding dispersion compensation control signal to the variable dispersion compensator 5A, thereby optically conducting the batch dispersion compensation with respect to the optical signals with the wavelengths λ1 to λn.

That is, this optical receiving apparatus 1C is designed to make the compensation at two stages, that is, the variable dispersion compensator 5A performs the optical dispersion compensation in batches with respect to all the channels and the equalization amplifier 5 conducts the electrical dispersion compensation with respect to each of the channels. Therefore, even if the optical batch dispersion compensation cannot achieve the compensation for the waveform degradation, owing to the electrical dispersion compensation according to channel at the latter stage, it is possible to achieve the compensation for received waveform degradation more certainly.

Moreover, in this case, since the waveform degradation is compensated for to some extent at the time of the execution of the optical dispersion compensation, the electrical dispersion compensation quantity in the equalization amplifier 5 is further reducible as compared with no execution of the optical dispersion compensation. Accordingly, it is possible to lighten the characteristics (compensation capability) such as phase variable width and gain variable width needed for the phase shifter 52, the amplifier 53 and others constituting the equalization amplifier 5, thus realizing this optical receiving apparatus 1C at a lower cost.

In the above-described example, although the differences on the both-end wavelengths λ1 and λn from the reference waveform are used for obtaining the slope of the chromatic dispersion characteristic in the dispersion compensation control circuit 35, as a matter of course, it is not always necessary to use both end wavelengths, but it is also possible to employ the differences on arbitrary two wavelengths (however, two wavelengths separated as much as possible from each other are more preferable than two wavelengths adjacent to each other). Moreover, naturally, it is also possible to obtain the slope of a chromatic dispersion characteristic through the use of the differences on three or more wavelengths.

Furthermore, if a device capable of additionally changing the slope of the chromatic dispersion characteristic is applied to the variable dispersion compensator 5A, it is effective to obtain the slope of the chromatic dispersion characteristic using the differences on two or more wavelengths as mentioned above, while in other cases, it is not always necessary to obtain the slope of the chromatic dispersion characteristic. In such cases, as with the second embodiment (see FIG. 17), it is also possible that a dispersion compensation quantity correction value is acquired on the basis of a difference on one wavelength to control the variable dispersion compensator 5A. However, naturally, it is also possible to employ the difference information on two or more wavelengths for the purpose of upgrading the accuracy of the correction value to be obtained.

(B-4) Fourth Embodiment

Figure 19:
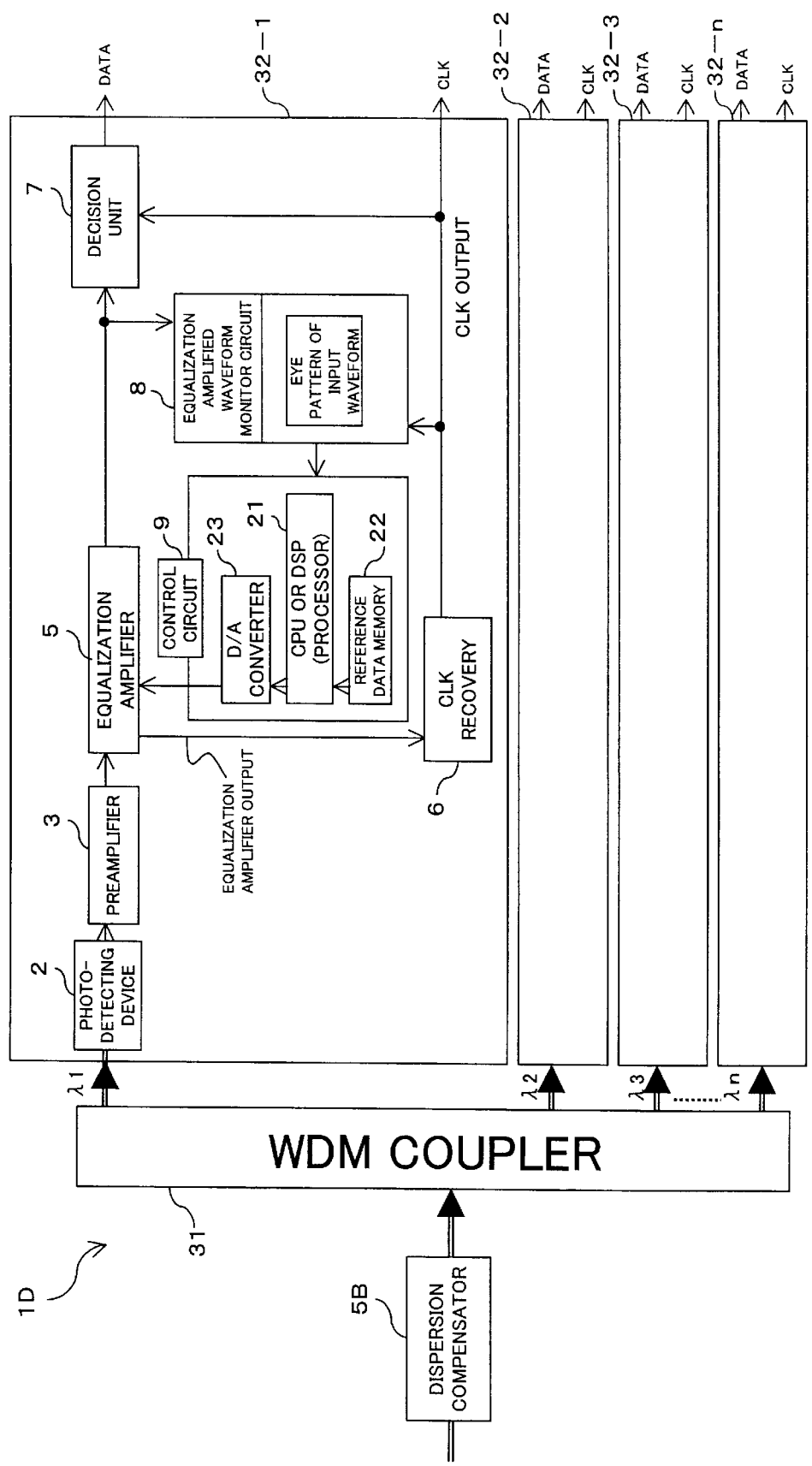
FIG. 19 is a block diagram showing a configuration of an essential part of an optical receiving apparatus according to a fourth embodiment of the present invention, which is applicable to a WDM optical transmission system.

FIG. 19 is a block diagram showing a configuration of an essential part of an optical receiving apparatus according to a fourth embodiment of the present invention. In FIG. 19, an optical receiving apparatus 1D is made up of an optical dispersion compensator (which will hereinafter be referred to simply as a "dispersion compensator") 5B whose chromatic dispersion characteristic is fixed, a WDM coupler (demultiplexer) 31 for demultiplexing a received WDM signal according to wavelength λi, and a plurality of optical receiving sections 32-1 to 32-n respectively provided with respect to wavelengths λi after demultiplexed. Each of the optical receiving sections 32-i includes a monitor circuit 8 (a divider 11, a delay controller 12, a sampler 13, an A/D converter 14, a waveform recording memory 15 and a processor 21 such as a CPU or DSP) and a control circuit 9 (a processor 21, a reference data memory 22 and a D/A converter 23) shown in FIG. 1 (in FIG. 19, the internal components of the monitor circuit 8 and the optical receiving sections 32-2 to 32-n are omitted from the illustration).

That is, in the configuration of the optical receiving apparatus 1D shown in FIG. 19, the optical receiving apparatus 1 shown in FIG. 1 is provided a number of wavelengths multiplexed in a WDM signal. In other words, the monitor circuit 8 and the processor 21 (calculating means 210), functioning as the aforesaid waveform degradation detecting unit, is provided with respect to each of the wavelengths λi, while the aforesaid dispersion compensator 5B and a plurality of frequency characteristic variable type equalization amplifiers 5 provided with respect to each of the electric signals after the photoelectric conversion of the demultiplexed optical signals by the WDM coupler 31 in the photo-detecting device 2 constitute a waveform degradation compensating means.

In addition, each of the control circuits 9 functions as an equalization amplifier control section for each wavelength λi to control the frequency characteristic of the corresponding equalization amplifier 5 for minimizing the difference between a received waveform detected by the corresponding waveform degradation detecting unit and a reference waveform, and these control circuits 9 realize a control means for controlling the compensation characteristic of the aforesaid waveform degradation compensating means.

With the above-described configuration, in this optical receiving apparatus 1D, the dispersion compensator 5B compensates optically for the waveform degradation arising from the chromatic dispersion of a WDM signal to some extent, and each of the optical receiving sections 32-i conducts the monitor/recording of an eye pattern of a received signal, the difference detection from a reference waveform and the frequency characteristic control of the equalization amplifier 5 for minimizing the detected difference, mentioned above in the basic mode, thereby accomplishing the electrical waveform degradation compensation according to wavelength λi.

Accordingly, also in this case, the advantages and effects similar to those mentioned above in the basic mode are obtainable, and as with the above-described third embodiment, it is possible to lighten the characteristics such as phase variable width and gain variable width needed for the phase shifter 52, the amplifier 53 and others constituting the equalization amplifier 5, thus realizing this optical receiving apparatus 1D at a lower cost.

Incidentally, if the compensation by the equalization amplifier 5 achieves sufficient compensation, it is also possible to remove the aforesaid dispersion compensator 5B.

(C) Others

Although all the above-described embodiments are made to detect the waveform stemming from the chromatic dispersion, it is possible to detect the waveform degradation stemming from the polarization mode dispersion in the same way. That is, according to the present invention, because of the calculation of the difference in frequency between a received waveform and a reference waveform, the waveform degradation quantity is detectable in the same manner whether the factor to the waveform degradation is the chromatic dispersion or the polarization mode dispersion.

Accordingly, the above-mentioned compensation by the equalization amplifier 5 is similarly feasible with respect to the waveform degradation stemming from the polarization mode dispersion, and when a well-known movable polarization mode dispersion compensator is used in place of the variable dispersion compensator 5A or 5A-i, the compensation at the optical signal stage is also feasible. In addition, the compensation for the waveform degradation stemming from both the chromatic dispersion and polarization mode dispersion is also feasible through the use of a combination of the variable dispersion compensator 5A (5A-1) and the variable polarization mode dispersion compensator. In particular, in this case, since the difference detecting system and the compensation control system are used in common with respect to the chromatic dispersion and the polarization mode dispersion, the size reduction of the apparatus is achievable.

In addition, although all the above-described embodiments relate to the application of the present invention to an optical receiving apparatus for receiving optical signals, the invention is also applicable to a receiving apparatus for receiving electric signals. Still additionally, a section [monitor circuit 8 (8a, 8b)] or a section functioning as a waveform degradation detecting unit functioning as a received signal waveform measuring unit is applicable to any apparatus if it is capable of receiving a signal subjected to waveform degradation, and it is possible to conduct the waveform monitor and detection of the waveform degradation quantity with high accuracy.

Moreover, although in the above-described embodiments the FFT is used for the conversion of received waveform data into a frequency domain, the present invention is not limited to this, but it is also possible to employ another method for the conversion into a frequency domain.

It should be understood that the present invention is not limited to the above-described embodiments, and that it is intended to coverall changes and modifications of the embodiments of the invention herein which do not constitute departures from the spirit and scope of the invention.

What is claimed is:

1. A receiving apparatus comprising:
compensation characteristic variable type waveform degradation compensating means for compensating for waveform degradation of a received signal;
received waveform measuring means for measuring received waveform data being waveform data on said received signal; and
control means for controlling a compensation characteristic of said waveform degradation compensating means, with a difference between frequency data of said received signal, obtained by converting said received waveform data measured by said received waveform measuring means into a frequency domain, and frequency data of a reference waveform free from waveform degradation, reaching a minimum.

2. A receiving apparatus according to claim 1, wherein said received waveform measuring means comprises:
an equivalent-time sampling section for equivalent-time-sampling said received signal to acquire a plurality of wave-height data on said received signal; and
a wave-height data recording section for recording, as said received waveform data, said wave-height data acquired by said equivalent-time sampling section.

3. A receiving apparatus according to claim 2, wherein said equivalent-time sampling section comprises:
a sampling timing generating circuit for generating a sampling timing on the basis of a reference clock synchronized with said received signal to output said sampling timing while shifting a timing of output thereof periodically; and
a sampling circuit for sampling said received signal in accordance with said sampling timing generated in said sampling timing generating circuit to acquire said wave-height data.

4. A receiving apparatus according to claim 3, wherein said sampling timing generating circuit comprises:
a divider for dividing said reference clock down; and
a delay control circuit for supplying an output of said divider to said sampling circuit while delaying said output periodically.

5. A receiving apparatus according to claim 1, wherein said control means comprises:
a reference waveform data storing section for storing said frequency data on said reference waveform previously;
a Fourier-transform section for performing Fourier transform of said received waveform data to obtain said frequency data on said received signal;
a difference calculating section for calculating a difference between said frequency data obtained by said Fourier transform section and said frequency data in said reference waveform data storing section;
a compensation characteristic determining section for obtaining a compensation characteristic of said waveform degradation compensating means which minimizes said difference calculated by said difference calculating section; and
a control signal generating section for generating a control signal for controlling said waveform degradation compensating means so that said waveform degradation compensating means has said compensation characteristic obtained by said compensation characteristic determining section.

6. A receiving apparatus according to claim 1, wherein said waveform degradation compensating means is constructed with an equalization amplifier having a variable frequency/phase characteristic as said compensation characteristic, and said control means is made to control said frequency/phase characteristic of said equalization amplifier.

7. A receiving apparatus according to claim 6, wherein said equalization amplifier comprises:
a plurality of band-pass filters having different pass bands with respect to said received signal; and
a plurality of phase/gain adjusting circuits each for performing phase adjustment and gain adjustment with respect to each of outputs of said band-pass filters, each of said plurality of phase/gain adjusting circuits comprising a phase shifter for performing the phase adjustment with respect to an input signal and a gain variable amplifier for amplifying said input signal, with said phase shifter and said gain variable amplifier being connected in series to each other, said control means being made to individually control a phase adjustment quantity in said phase shifter and an amplification degree in said amplifier for controlling said frequency/phase characteristic.

8. A receiving apparatus according to claim 2, wherein said control means comprises:

a reference waveform data storing section for storing said frequency data on said reference waveform previously;

a Fourier-transform section for performing Fourier transform of said received waveform data to obtain said frequency data on said received signal;

a difference calculating section for calculating a difference between said frequency data obtained by said Fourier transform section and said frequency data in said reference waveform data storing section;

a compensation characteristic determining section for obtaining a compensation characteristic of said waveform degradation compensating means which minimizes said difference calculated by said difference calculating section; and a control signal generating section for generating a control signal for controlling said waveform degradation compensating means so that said waveform degradation compensating means has said compensation characteristic obtained by said compensation characteristic determining section.

9. A receiving apparatus according to claim 8, wherein said waveform degradation compensating means is constructed with an equalization amplifier having a variable frequency/phase characteristic as said compensation characteristic, and said control means is made to control said frequency/phase characteristic of said equalization amplifier.

10. A receiving apparatus according to claim 9, wherein said equalization amplifier comprises:

a plurality of band-pass filters having different pass bands with respect to said received signal; and a plurality of phase/gain adjusting circuits each for performing phase adjustment and gain adjustment with respect to each of outputs of said band-pass filters, each of said plurality of phase/gain adjusting circuits comprising a phase shifter for performing the phase adjustment with respect to an input signal and a gain variable amplifier for amplifying said input signal, with said phase shifter and said gain variable amplifier being connected in series to each other, said control means being made to individually control a phase adjustment quantity in said phase shifter and an amplification degree in said amplifier for controlling said frequency/phase characteristic.

11. A receiving apparatus according to claim 2, wherein said waveform degradation compensating means is constructed with an equalization amplifier having a variable frequency/phase characteristic as said compensation characteristic, and said control means is made to control said frequency/phase characteristic of said equalization amplifier.

12. A receiving apparatus according to claim 11, wherein said equalization amplifier comprises:

a plurality of band-pass filters having different pass bands with respect to said received signal; and a plurality of phase/gain adjusting circuits each for performing phase adjustment and gain adjustment with respect to each of outputs of said band-pass filters, each of said plurality of phase/gain adjusting circuits comprising a phase shifter for performing the phase adjustment with respect to an input signal and a gain variable amplifier for amplifying said input signal, with said phase shifter and said gain variable amplifier being connected in series to each other, said control means being made to individually control a phase adjustment quantity in said phase shifter and an amplification degree in said amplifier for controlling said frequency/phase characteristic.

13. A receiving apparatus according to claim 2, wherein, in a case in which said received signal is a signal which is received through an optical transmission line and undergoes waveform degradation based on a chromatic dispersion characteristic of said optical transmission line as said waveform degradation, said waveform degradation compensating means is constructed with a variable dispersion compensator having a variable dispersion compensation characteristic as said compensation characteristic, while said control means is designed to control said dispersion compensation characteristic of said variable dispersion compensator.

14. A receiving apparatus according to claim 3, wherein said control means comprises:

a reference waveform data storing section for storing said frequency data on said reference waveform previously;

a Fourier-transform section for performing Fourier transform of said received waveform data to obtain said frequency data on said received signal;

a difference calculating section for calculating a difference between said frequency data obtained by said Fourier transform section and said frequency data in said reference waveform data storing section;

a compensation characteristic determining section for obtaining a compensation characteristic of said waveform degradation compensating means which minimizes said difference calculated by said difference calculating section; and a control signal generating section for generating a control signal for controlling said waveform degradation compensating means so that said waveform degradation compensating means has said compensation characteristic obtained by said compensation characteristic determining section.

15. A receiving apparatus according to claim 14, wherein said waveform degradation compensating means is constructed with an equalization amplifier having a variable frequency/phase characteristic as said compensation characteristic, and said control means is made to control said frequency/phase characteristic of said equalization amplifier.

16. A receiving apparatus according to claim 15, wherein said equalization amplifier comprises:

a plurality of band-pass filters having different pass bands with respect to said received signal; and a plurality of phase/gain adjusting circuits each for performing phase adjustment and gain adjustment with respect to each of outputs of said band-pass filters, each of said plurality of phase/gain adjusting circuits comprising a phase shifter for performing the phase adjustment with respect to an input signal and a gain variable amplifier for amplifying said input signal, with said phase shifter and said gain variable amplifier being connected in series to each other, said control means being made to individually control a phase adjustment quantity in said phase shifter and an amplification degree in said amplifier for controlling said frequency/phase characteristic.

17. A receiving apparatus according to claim 3, wherein said waveform degradation compensating means is constructed with an equalization amplifier having a variable frequency/phase characteristic as said compensation characteristic, and said control means is made to control said frequency/phase characteristic of said equalization amplifier.

18. A receiving apparatus according to claim 17, wherein said equalization amplifier comprises:
   a plurality of band-pass filters having different pass bands with respect to said received signal; and
   a plurality of phase/gain adjusting circuits each for performing phase adjustment and gain adjustment with respect to each of outputs of said band-pass filters, each of said plurality of phase/gain adjusting circuits comprising a phase shifter for performing the phase adjustment with respect to an input signal and a gain variable amplifier for amplifying said input signal, with said phase shifter and said gain variable amplifier being connected in series to each other,
   said control means being made to individually control a phase adjustment quantity in said phase shifter and an amplification degree in said amplifier for controlling said frequency/phase characteristic.

19. A receiving apparatus according to claim 3, wherein, in a case in which said received signal is a signal which is received through an optical transmission line and undergoes waveform degradation based on a chromatic dispersion characteristic of said optical transmission line as said waveform degradation, said waveform degradation compensating means is constructed with a variable dispersion compensator having a variable dispersion compensation characteristic as said compensation characteristic, while said control means is designed to control said dispersion compensation characteristic of said variable dispersion compensator.

20. A receiving apparatus according to claim 4, wherein said waveform degradation compensating means is constructed with an equalization amplifier having a variable frequency/phase characteristic as said compensation characteristic, and said control means is made to control said frequency/phase characteristic of said equalization amplifier.

21. A receiving apparatus according to claim 20, wherein said equalization amplifier comprises:
   a plurality of band-pass filters having different pass bands with respect to said received signal; and
   a plurality of phase/gain adjusting circuits each for performing phase adjustment and gain adjustment with respect to each of outputs of said band-pass filters, each of said plurality of phase/gain adjusting circuits comprising a phase shifter for performing the phase adjustment with respect to an input signal and a gain variable amplifier for amplifying said input signal, with said phase shifter and said gain variable amplifier being connected in series to each other,
   said control means being made to individually control a phase adjustment quantity in said phase shifter and an amplification degree in said amplifier for controlling said frequency/phase characteristic.

22. A receiving apparatus according to claim 4, wherein, in a case in which said received signal is a signal which is received through an optical transmission line and undergoes waveform degradation based on a chromatic dispersion characteristic of said optical transmission line as said waveform degradation, said waveform degradation compensating means is constructed with a variable dispersion compensator having a variable dispersion compensation characteristic as said compensation characteristic, while said control means is designed to control said dispersion compensation characteristic of said variable dispersion compensator.

23. A receiving apparatus according to claim 5, wherein, in a case in which said received signal is a signal which is received through an optical transmission line and undergoes waveform degradation based on a chromatic dispersion characteristic of said optical transmission line as said waveform degradation, said waveform degradation compensating means is constructed with a variable dispersion compensator having a variable dispersion compensation characteristic as said compensation characteristic, while said control means is designed to control said dispersion compensation characteristic of said variable dispersion compensator.

24. A receiving apparatus according to claim 1, wherein said control means comprises:
   a reference waveform data storing section for storing said frequency data on said reference waveform previously;
   a Fourier-transform section for performing Fourier transform of said received waveform data to obtain said frequency data on said received signal;
   a difference calculating section for calculating a difference between said frequency data obtained by said Fourier transform section and said frequency data in said reference waveform data storing section;
   a compensation characteristic determining section for obtaining a compensation characteristic of said waveform degradation compensating means which minimizes said difference calculated by said difference calculating section; and
   a control signal generating section for generating a control signal for controlling said waveform degradation compensating means so that said waveform degradation compensating means has said compensation characteristic obtained by said compensation characteristic determining section.

25. A receiving apparatus according to claim 24, wherein said waveform degradation compensating means is constructed with an equalization amplifier having a variable frequency/phase characteristic as said compensation characteristic, and said control means is made to control said frequency/phase characteristic of said equalization amplifier.

26. A receiving apparatus according to claim 25, wherein said equalization amplifier comprises:
   a plurality of band-pass filters having different pass bands with respect to said received signal; and
   a plurality of phase/gain adjusting circuits each for performing phase adjustment and gain adjustment with respect to each of outputs of said band-pass filters, each of said plurality of phase/gain adjusting circuits comprising a phase shifter for performing the phase adjustment with respect to an input signal and a gain variable amplifier for amplifying said input signal, with said phase shifter and said gain variable amplifier being connected in series to each other,
   said control means being made to individually control a phase adjustment quantity in said phase shifter and an amplification degree in said amplifier for controlling said frequency/phase characteristic.

27. A receiving apparatus according to claim 1, wherein said waveform degradation compensating means is constructed with an equalization amplifier having a variable frequency/phase characteristic as said compensation characteristic, and said control means is made to control said frequency/phase characteristic of said equalization amplifier.

28. A receiving apparatus according to claim 27, wherein said equalization amplifier comprises:
a plurality of band-pass filters having different pass bands with respect to said received signal; and
a plurality of phase/gain adjusting circuits each for performing phase adjustment and gain adjustment with respect to each of outputs of said band-pass filters, each of said plurality of phase/gain adjusting circuits comprising a phase shifter for performing the phase adjustment with respect to an input signal and a gain variable amplifier for amplifying said input signal, with said phase shifter and said gain variable amplifier being connected in series to each other,
said control means being made to individually control a phase adjustment quantity in said phase shifter and an amplification degree in said amplifier for controlling said frequency/phase characteristic.

29. A receiving apparatus according to claim 1, wherein, in a case in which said received signal is a signal which is received through an optical transmission line and undergoes waveform degradation based on a chromatic dispersion characteristic of said optical transmission line as said waveform degradation, said waveform degradation compensating means is constructed with a variable dispersion compensator having a variable dispersion compensation characteristic as said compensation characteristic, while said control means is designed to control said dispersion compensation characteristic of said variable dispersion compensator.

30. A receiving apparatus comprising:
a demultiplexing section for receiving a wavelength-multiplexed optical signal comprising a plurality of types of wavelengths multiplexed, through an optical transmission line to perform demultiplexing according to wavelength;
compensation characteristic variable type waveform degradation compensating means for compensating for waveform degradation said wavelength-multiplexed optical signal undergoes due to a dispersion characteristic of said optical transmission line;
received waveform degradation detecting means provided with respect to at least one optical signal with a specified wavelength, of the demultiplexed optical signals from said demultiplexing section, for detecting a difference between frequency data in a frequency domain of a received signal after photoelectric conversion of said optical signal and frequency data on a reference waveform free from waveform degradation; and
control means for controlling a compensation characteristic of said waveform degradation compensating means so that the difference on said specified wavelength, obtained by said received waveform degradation detecting means, reaches a minimum.

31. A receiving apparatus according to claim 30, wherein said waveform degradation compensating means is constructed as a dispersion characteristic variable type variable optical dispersion compensator placed at the former stage of said demultiplexing section, while said control means is constructed as a batch compensation control section made to batch-control a dispersion characteristic of said variable optical dispersion compensator in common with respect to said wavelengths.

32. A receiving apparatus according to claim 31, wherein said received waveform degradation detecting means comprises:
received waveform measuring means for measuring received waveform data; and
calculating means for calculating a difference between said frequency data on said received signal, obtained by performing Fourier-transform of said received waveform data measured by said received waveform measuring means, and said frequency data on said reference waveform.

33. A receiving apparatus according to claim 32, wherein said received waveform measuring means comprises:
an equivalent-time sampling section for equivalent-time-sampling said received signal to acquire a plurality of wave-height data on said received signal; and
a waveform data recording section for recording said wave-height data acquired by said equivalent-time sampling section, as said received waveform data.

34. A receiving apparatus according to claim 33, wherein said equivalent-time sampling section comprises:
a sampling timing generating circuit for generating a sampling timing on the basis of a reference clock synchronized with said received signal to output said sampling timing while shifting a timing of output thereof periodically; and
a sampling circuit for sampling said received signal in accordance with said sampling timing generated in said sampling timing generating circuit to acquire said wave-height data.

35. A receiving apparatus according to claim 34, wherein said sampling timing generating circuit comprises:
a divider for dividing said reference clock down; and
a delay control circuit for supplying an output of said divider to said sampling circuit while delaying said output periodically.

36. A receiving apparatus according to claim 30, wherein said waveform degradation compensating means is composed of a plurality of dispersion characteristic variable type variable optical dispersion compensators each provided for each of optical signals before photoelectric conversion at the latter stage of said demultiplexing section, while said control means is constructed as an individual compensation control section for calculating differences on all wavelengths on the basis of said difference with respect to said specified wavelength to control dispersion compensation characteristics of said variable optical dispersion compensators individually so that each of the differences reaches a minimum.

37. A receiving apparatus according to claim 36, wherein said received waveform degradation detecting means comprises:
received waveform measuring means for measuring received waveform data; and
calculating means for calculating a difference between said frequency data on said received signal, obtained by performing Fourier-transform of said received waveform data measured by said received waveform measuring means, and said frequency data on said reference waveform.

38. A receiving apparatus according to claim 37, wherein said received waveform measuring means comprises:
an equivalent-time sampling section for equivalent-time-sampling said received signal to acquire a plurality of wave-height data on said received signal; and
a waveform data recording section for recording said wave-height data acquired by said equivalent-time sampling section, as said received waveform data.

39. A receiving apparatus according to claim 38, wherein said equivalent-time sampling section comprises:
  a sampling timing generating circuit for generating a sampling timing on the basis of a reference clock synchronized with said received signal to output said sampling timing while shifting a timing of output thereof periodically; and
  a sampling circuit for sampling said received signal in accordance with said sampling timing generated in said sampling timing generating circuit to acquire said wave-height data.

40. A receiving apparatus according to claim 39, wherein said sampling timing generating circuit comprises:
  a divider for dividing said reference clock down; and
  a delay control circuit for supplying an output of said divider to said sampling circuit while delaying said output periodically.

41. A receiving apparatus according to claim 30, wherein said received waveform degradation detecting means is provided with respect to each of the wavelengths, and said waveform degradation compensating means is composed of a dispersion characteristic variable type variable optical dispersion compensator placed at the former stage of said demultiplexing section and a plurality of frequency/phase characteristic variable type equalization amplifiers placed with respect to each of electric signals after the photoelectric conversion of the demultiplexed optical signals from said demultiplexing section, while said control means is composed of equalization amplifier control sections each placed according to wavelength for controlling a frequency/phase characteristic of the corresponding equalization amplifier to minimize the difference detected by the corresponding received waveform degradation detecting means and a batch compensation control section for batch-controlling a dispersion characteristic of said variable optical dispersion compensator on the basis of the difference on said specified wavelength in common with respect to the wavelengths.

42. A receiving apparatus according to claim 41, wherein said received waveform degradation detecting means comprises:
  received waveform measuring means for measuring received waveform data; and
  calculating means for calculating a difference between said frequency data on said received signal, obtained by performing Fourier-transform of said received waveform data measured by said received waveform measuring means, and said frequency data on said reference waveform.

43. A receiving apparatus according to claim 42, wherein said received waveform measuring means comprises:
  an equivalent-time sampling section for equivalent-time-sampling said received signal to acquire a plurality of wave-height data on said received signal; and
  a waveform data recording section for recording said wave-height data acquired by said equivalent-time sampling section, as said received waveform data.

44. A receiving apparatus according to claim 43, wherein said equivalent-time sampling section comprises:
  a sampling timing generating circuit for generating a sampling timing on the basis of a reference clock synchronized with said received signal to output said sampling timing while shifting a timing of output thereof periodically; and
  a sampling circuit for sampling said received signal in accordance with said sampling timing generated in said sampling timing generating circuit to acquire said wave-height data.

45. A receiving apparatus according to claim 44, wherein said sampling timing generating circuit comprises:
  a divider for dividing said reference clock down; and
  a delay control circuit for supplying an output of said divider to said sampling circuit while delaying said output periodically.

46. A receiving apparatus according to claim 30, wherein said received waveform degradation detecting means is provided with respect to each of the wavelengths, and said waveform degradation compensating means is composed of a plurality of frequency/phase characteristic variable type equalization amplifiers each placed with respect to each of electric signals after photoelectric conversion of the demultiplexed optical signals from said demultiplexing section, while said control means is composed of equalization amplifier control sections each placed according to wavelength for controlling a frequency/phase characteristic of the corresponding equalization amplifier to minimize the difference detected by the corresponding received waveform degradation detecting means.

47. A receiving apparatus according to claim 46, wherein said received waveform degradation detecting means comprises:
  received waveform measuring means for measuring received waveform data; and
  calculating means for calculating a difference between said frequency data on said received signal, obtained by performing Fourier-transform of said received waveform data measured by said received waveform measuring means, and said frequency data on said reference waveform.

48. A receiving apparatus according to claim 47, wherein said received waveform measuring means comprises:
  an equivalent-time sampling section for equivalent-time-sampling said received signal to acquire a plurality of wave-height data on said received signal; and
  a waveform data recording section for recording said wave-height data acquired by said equivalent-time sampling section, as said received waveform data.

49. A receiving apparatus according to claim 48, wherein said equivalent-time sampling section comprises:
  a sampling timing generating circuit for generating a sampling timing on the basis of a reference clock synchronized with said received signal to output said sampling timing while shifting a timing of output thereof periodically; and
  a sampling circuit for sampling said received signal in accordance with said sampling timing generated in said sampling timing generating circuit to acquire said wave-height data.

50. A receiving apparatus according to claim 49, wherein said sampling timing generating circuit comprises:
  a divider for dividing said reference clock down; and
  a delay control circuit for supplying an output of said divider to said sampling circuit while delaying said output periodically.

51. A receiving apparatus according to claim 30, wherein said received waveform degradation detecting means comprises:
  received waveform measuring means for measuring received waveform data; and
  calculating means for calculating a difference between said frequency data on said received signal, obtained by performing Fourier-transform of said received waveform data measured by said received waveform measuring means, and said frequency data on said reference waveform.

52. A receiving apparatus according to claim 51, wherein said received waveform measuring means comprises:
- an equivalent-time sampling section for equivalent-time-sampling said received signal to acquire a plurality of wave-height data on said received signal; and
- a waveform data recording section for recording said wave-height data acquired by said equivalent-time sampling section, as said received waveform data.

53. A receiving apparatus according to claim 52, wherein said equivalent-time sampling section comprises:
- a sampling timing generating circuit for generating a sampling timing on the basis of a reference clock synchronized with said received signal to output said sampling timing while shifting a timing of output thereof periodically; and
- a sampling circuit for sampling said received signal in accordance with said sampling timing generated in said sampling timing generating circuit to acquire said wave-height data.

54. A receiving apparatus according to claim 53, wherein said sampling timing generating circuit comprises:
- a divider for dividing said reference clock down; and
- a delay control circuit for supplying an output of said divider to said sampling circuit while delaying said output periodically.

55. A received signal waveform degradation detecting apparatus comprising:
- received waveform measuring means for measuring received waveform data being waveform data on a received signal;
- calculating means for calculating a difference between frequency data on said received signal obtained by converting said received waveform data, measured by said received waveform measuring means, into a frequency domain and frequency data on a reference waveform free from waveform degradation.

56. A received signal waveform degradation detecting apparatus according to claim 55, wherein said received waveform measuring means comprises:
- an equivalent-time sampling section for equivalent-time-sampling said received signal to acquire a plurality of wave-height data on said received signal; and
- a waveform data recording section for recording said wave-height data acquired by said equivalent-time sampling section, as said received waveform data.

57. A received signal waveform degradation detecting apparatus according to claim 56, wherein said equivalent-time sampling section comprises:
- a sampling timing generating circuit for generating a sampling timing on the basis of a reference clock synchronized with said received signal to output said sampling timing while shifting a timing of output thereof periodically; and
- a sampling circuit for sampling said received signal in accordance with said sampling timing generated in said sampling timing generating circuit to acquire said wave-height data.

58. A received signal waveform degradation detecting apparatus according to claim 57, wherein said sampling timing generating circuit comprises:
- a divider for dividing said reference clock down; and
- a delay control circuit for supplying an output of said divider to said sampling circuit while delaying said output periodically.

59. A received signal waveform measuring apparatus comprising:
- an equivalent-time sampling section for equivalent-time-sampling a received signal to acquire a plurality of wave-height data on said received signal; and
- a waveform data recording section for recording said wave-height data acquired by said equivalent-time sampling section, as waveform data on said received signal to be converted into a frequency domain for calculation of a difference from frequency data on a reference waveform free from waveform degradation.

60. A received signal waveform measuring apparatus according to claim 59, wherein said equivalent-time sampling section comprises:
- a sampling timing generating circuit for generating a sampling timing on the basis of a reference clock synchronized with said received signal to output said sampling timing while shifting a timing of output thereof periodically; and
- a sampling circuit for sampling said received signal in accordance with said sampling timing generated in said sampling timing generating circuit to acquire said wave-height data.

61. A received signal waveform measuring apparatus according to claim 60, wherein said sampling timing generating circuit comprises:
- a divider for dividing said reference clock down; and
- a delay control circuit for supplying an output of said divider to said sampling circuit while delaying said output periodically.

62. A received signal waveform degradation compensating method for use in a receiving apparatus equipped with a compensation characteristic variable type waveform degradation compensating means for compensating for waveform degradation of a received signal, said waveform degradation compensating method comprising:
- measuring received waveform data being waveform data of the received signal;
- calculating a difference between frequency data on the received signal obtained by converting the received waveform data, measured by said measuring received waveform data, into a frequency domain and frequency data on a reference waveform free from waveform degradation; and
- controlling a compensation of the waveform degradation compensating means to minimize the difference calculated in said calculating a difference.

63. A received signal waveform degradation compensating method according to claim 62, wherein said measuring received waveform data comprises:
- equivalent-time sampling the received signal to acquire a plurality of wave-height data on the received signal; and
- recording the wave-height data acquired in said equivalent-time sampling, as the received waveform data.

64. A received signal waveform degradation compensating method according to claim 63, wherein said equivalent-time sampling comprises:
- generating a sampling timing on the basis of a reference clock synchronized with the received signal;
- shifting an output timing of the sampling timing periodically; and
- sampling the received signal in accordance with the sampling timing periodically shifted in said shifting an output timing to acquire the wave-height data.

65. A received signal waveform degradation compensating method according to claim 64, wherein
- said generating a sampling timing comprises dividing the reference clock down, and
- said shifting an output timing comprises outputting the sampling timing while periodically delaying the reference clock after dividing in said dividing the reference clock down.

66. A received signal waveform degradation compensating method according to claim 65, wherein said controlling a compensation comprises:
   obtaining a compensation characteristic of the waveform degradation compensating means which minimizes the difference calculated in said calculating a difference; and
   generating a control signal for controlling the waveform degradation compensating means with the waveform degradation compensating means having the compensation characteristic obtained in said obtaining a compensation characteristic.

67. A received signal waveform degradation compensating method according to claim 63, wherein said controlling a compensation comprises:
   obtaining a compensation characteristic of the waveform degradation compensating means which minimizes the difference calculated in said calculating a difference; and
   generating a control signal for controlling the waveform degradation compensating means with the waveform degradation compensating means having the compensation characteristic obtained in said obtaining a compensation characteristic.

68. A received signal waveform degradation compensating method according to claim 64, wherein said controlling a compensation comprises:
   obtaining a compensation characteristic of the waveform degradation compensating means which minimizes the difference calculated in said calculating a difference; and
   generating a control signal for controlling the waveform degradation compensating means with the waveform degradation compensating means having the compensation characteristic obtained in said obtaining a compensation characteristic.

69. A received signal waveform degradation compensating method for use in a receiving apparatus equipped with a demultiplexing section made to receive a wavelength-multiplexed optical signal comprising a plurality of types of wavelengths multiplexed from an optical transmission line for demultiplexing the wavelength-multiplexed optical signal into optical signals respectively having the wavelengths, said waveform degradation compensating method comprising:
   detecting, with respect to at least one optical signal with a specified wavelength of the wavelength demultiplexed optical signals obtained by the demultiplexing in the demulitplexing section, a difference between frequency data in a received signal frequency domain obtained after photoelectric conversion of the optical signal and frequency data of a reference waveform free from waveform degradation arising from the optical transmission line; and
   controlling a compensation characteristic of a compensation characteristic variable type waveform degradation compensating means on the basis of the detected difference of the specified wavelength to compensate for waveform degradation the wavelength-multiplexed optical signal undergoes due to the optical transmission line.

70. A received signal waveform degradation detecting method comprising:
   measuring received waveform data being waveform data of a received signal; and
   calculating a difference between frequency data of the received signal, obtained by performing frequency conversion of the received waveform data measured by said measuring received waveform data, and frequency data of a reference waveform free from waveform degradation.

71. A received signal waveform degradation detecting method according to claim 70, wherein said measuring received waveform data comprises:
   equivalent-time sampling the received signal to acquire a plurality of wave-height data for the received signal; and
   recording the wave-height data acquired in said equivalent-time sampling, as the received waveform data.

72. A received signal waveform degradation detecting method according to claim 71, wherein said equivalent-time sampling comprises:
   generating a sampling timing on the basis of a reference clock synchronized with the received signal;
   shifting an output timing of the sampling timing periodically; and
   sampling the received signal in accordance with the sampling timing periodically shifted in said shifting an output timing to acquire the wave-height data.

73. A received signal waveform degradation detecting method according to claim 72, wherein
   said generating a sampling timing comprises dividing the reference clock down, and
   said shifting an output timing comprises outputting the sampling timing while periodically delaying the reference clock after the dividing in said dividing the reference clock down.

74. A received signal waveform measuring method comprising:
   equivalent-time sampling a received signal to acquire a plurality of wave-height data of the received signal; and
   recording the wave-height data acquired in said equivalent-time sampling, as waveform data of the received signal to be converted into a frequency domain for calculation of a difference from frequency data of a reference waveform free from waveform degradation.

75. A received signal waveform measuring method according to claim 74, wherein said equivalent-time sampling comprises:
   generating a sampling timing on the basis of a reference clock synchronized with the received signal;
   shifting an output timing of the sampling timing periodically; and
   sampling the received signal in accordance with the sampling timing periodically shifted in said shifting an output timing to acquire the wave-height data.

76. A received signal waveform measuring method according to claim 75, wherein
   said generating a sampling timing comprises dividing the reference clock down, and
   said shifting an output timing comprises outputting the sampling timing while periodically delaying the reference clock after the dividing in said dividing the reference clock down.

* * * * *